(12) United States Patent
Tada et al.

(10) Patent No.: US 8,860,673 B2
(45) Date of Patent: Oct. 14, 2014

(54) CONTROL CIRCUIT AND CONTROL METHOD FOR TOUCH PANEL

(75) Inventors: Naoki Tada, Kyoto (JP); Shinichi Abe, Kyoto (JP); Koichi Saito, Kyoto (JP); Kazunori Hisa, Kyoto (JP)

(73) Assignee: Rohm Co., Ltd. (JP)

( * ) Notice: Subject to any disclaimer, the term of this patent is extended or adjusted under 35 U.S.C. 154(b) by 1087 days.

(21) Appl. No.: 12/831,610

(22) Filed: Jul. 7, 2010

(65) Prior Publication Data

US 2011/0025642 A1 Feb. 3, 2011

(30) Foreign Application Priority Data

Jul. 7, 2009 (JP) ................................ 2009-160457
Sep. 2, 2009 (JP) ................................ 2009-203044
Jun. 1, 2010 (JP) ................................ 2010-125542

(51) Int. Cl.
    *G06F 3/041* (2006.01)
(52) U.S. Cl.
    CPC .................................... *G06F 3/0416* (2013.01)
    USPC ........................................................ 345/173
(58) Field of Classification Search
    USPC ................................................. 345/173, 174
    See application file for complete search history.

(56) References Cited

U.S. PATENT DOCUMENTS

| 4,929,934 | A  | * | 5/1990 | Ueda et al. ...................... 345/174 |
| 5,496,974 | A  | * | 3/1996 | Akebi et al. ................. 178/18.05 |
| 6,208,332 | B1 | * | 3/2001 | Ikegami ......................... 345/174 |
| 6,255,604 | B1 | * | 7/2001 | Tokioka et al. ............. 178/18.01 |
| 2003/0122796 | A1 | * | 7/2003 | Kong ............................. 345/173 |
| 2004/0217945 | A1 | * | 11/2004 | Miyamoto et al. ............. 345/173 |
| 2009/0322701 | A1 | * | 12/2009 | D'Souza et al. ............... 345/174 |
| 2011/0069029 | A1 | * | 3/2011 | Ryu et al. ....................... 345/173 |

FOREIGN PATENT DOCUMENTS

| CN | 1143771 A | 2/1997 |
| CN | 1428741 A | 7/2003 |
| CN | 101271374 A | 9/2008 |
| CN | 101286107 A | 10/2008 |
| JP | 09-034625 A | 2/1997 |
| JP | 2007-516481 A | 6/2007 |
| JP | 2009-48233 A | 5/2009 |
| WO | 2005/022372 A1 | 3/2005 |
| WO | 2009/058497 A2 | 5/2009 |

OTHER PUBLICATIONS

Japanese Office Action for Japanese patent application No. 2010-125542 mailing date of May 15, 2012 with English translation.
Office Action for the Chinese patent application No. 201010224918.6, dated Apr. 30, 2014. English translation attached.

* cited by examiner

*Primary Examiner* — Adam J Snyder
*Assistant Examiner* — Roy Rabindranath
(74) *Attorney, Agent, or Firm* — Cantor Colburn LLP

(57) ABSTRACT

A first resistive film is arranged such that one edge thereof is connected to a first terminal, and an edge that is opposite to the aforementioned edge is connected to a second terminal. A second resistive film is arranged with a gap between it and the first resistive film such that one edge thereof is connected to a third terminal. A voltage generating unit applies a predetermined first bias voltage and a predetermined second bias voltage to the first terminal and the second terminal, respectively. A voltage detection unit detects a panel voltage that occurs at the third terminal. A current detection unit detects a panel current that flows through a path including the first terminal, the first resistive film, and the second terminal. A computation unit determines the coordinates touched by the user, based upon the values of the panel voltage and the panel current.

12 Claims, 12 Drawing Sheets

CONTROL CIRCUIT AND CONTROL METHOD FOR TOUCH PANEL

Priority under 35 U.S.C. §119(a) and 35 U.S.C. §365(b) is claimed from Japanese Application No. JP2009-160457, filed 7 Jul. 2009, Japanese Application No. JP2009-203044, filed 2 Sep. 2009, and Japanese Application No. JP2010-125542 filed 1 Jun. 2010, the disclosures of all of which are also incorporated herein by reference.

BACKGROUND OF THE INVENTION

1. Field of the Invention

The present invention relates to a resistive film touch panel, and particularly to a technique for detecting a simultaneous touch state (multi-touch state) in which the user touches multiple points.

2. Description of the Related Art

In recent years, it has become mainstream for electronic devices such as computers, cellular phone terminals, PDAs (Personal Digital Assistants), etc., to include an input apparatus which allows the user to operate the electronic device by using the fingers to touch the input device. Known examples of such input devices include resistive film touch panels (touch sensors) (Patent document 1).

RELATED ART DOCUMENTS

Patent Documents

Patent Document 1
  Japanese Patent Application Laid Open No. 2009-48233
  In recent years, there is a demand for a touch panel which supports multi-touch operations. However, such touch panels have been realized only as electrostatic sensor touch panels, and have not been realized as resistive film touch panels. This is because, with such a resistive film touch panel, a position (coordinate) touched by the user is determined based upon the voltage output from the panel. However, such an arrangement is not capable of distinguishing between the output voltage of the panel in a case in which the user touches two positions (multi-touch operation) and the output voltage thereof in a case in which the user touches a single position (single touch operation).

Patent document 1 discloses a touch panel input apparatus which allows the user to perform multi-touch operations. However, this touch panel input apparatus handles such multi-touch operations as an input error. That is to say, such an arrangement does not actively support multi-touch operations as valid input operations. Thus, no technique has been disclosed which identifies the multiple coordinates involved in such a multi-touch operation.

SUMMARY OF THE INVENTION

The present invention has been made in order to solve such a problem. Accordingly, it is an exemplary purpose of the present invention to provide a control technique for a touch panel which supports multi-touch operations.

1. An embodiment of the present invention relates to a control method for a touch panel. The touch panel to be controlled comprises a first terminal, a second terminal, a third terminal, a first resistive film arranged such that one edge thereof is connected to the first terminal and an edge that is opposite to the aforementioned one edge is connected to the second terminal, and a second resistive film arranged with a gap between it and the first resistive film such that one edge thereof is connected to the third terminal. The control method comprises: applying a predetermined first bias voltage and a predetermined second bias voltage to the first and second terminals, respectively; detecting a panel voltage that occurs at the third terminal; detecting a panel current that flows through a path including the first terminal, the first resistive film, and the second terminal; and determining coordinates touched by a user, based upon the panel voltage and the panel current.

When the user touches multiple points on the touch panel, the combined resistance value of a path from the first terminal to the second terminal is reduced, and accordingly, the panel current changes according to the reduction in the combined resistance. By monitoring the panel current, such an embodiment is capable of appropriately detecting a multi-touch state. Furthermore, such an arrangement is capable of determining the coordinates of such multiple points.

Also, when the value of the panel current is greater than a predetermined value, judgment may be made that the user touched multiple points.

Also, when the user touches two points, the interval between the two coordinates may be determined based upon the value of the panel current. Also, the interval between the two coordinates may be determined to be a value which increases according to an increase in the panel current.

When the user touches two points, a portion of the first resistive film between the two points and a portion of the second resistive film therebetween are connected in parallel. Accordingly, the combined resistance of a path from the first terminal to the second terminal drops, thereby increasing the panel current. The length of the region where the first resistive film and the second resistive film are connected in parallel increases according to an increase in the distance between the two points, and thus the combined resistance drops, and the panel current increases. Thus, such an arrangement is capable of determining the interval between the two coordinates, based upon the panel current.

Also, the interval between the two coordinates may be determined based upon the difference between the panel current measured when the user does not touch the panel and the panel current measured when the user touches the panel.

Also, the judgment processing may comprise: determining the midpoint between the two coordinates based upon the panel voltage; and determining the coordinates of one of the two points by adding a value that corresponds to the interval between the two coordinates to the midpoint coordinates, and determining the coordinates of the other of the two points by subtracting, from the midpoint coordinates, a value that corresponds to the interval between the two coordinates.

Another embodiment of the present invention relates to a control circuit. The control circuit comprises: a voltage generating unit configured to apply a predetermined first bias voltage and a predetermined second bias voltage to first and second terminals of a touch panel, respectively; a voltage detection unit configured to detect a panel voltage that occurs at a third terminal of the touch panel; a current detection unit configured to detect a panel current that flows through a path including the first terminal of the touch panel, the first resistive film, and the second terminal; and a coordinate determination unit configured to determine the coordinates touched by the user, based upon the panel voltage and the panel current thus detected.

Also, when the value of the panel current is greater than a predetermined value, the coordinate determination unit may judge that the user touched multiple points.

Also, when the user touches two points, the interval between the two coordinates may be determined based upon the value of the panel current.

Also, the interval between the two coordinates may be determined based upon the difference between the panel current measured when the user does not touch the panel and the panel current measured when the user touches the panel.

Also, the coordinate determination unit may determine the midpoint between the two coordinates, based upon the panel voltage. Also, the coordinate determination unit may determine the coordinates of one of the aforementioned two points by adding a value that corresponds to the interval between the two coordinates to the midpoint coordinates. Also, the coordinate determination unit may determine the coordinates of the other of the two points by subtracting, from the midpoint coordinates, a value that corresponds to the interval between the two coordinates.

Also, the current detection unit may comprise: a detection resistor arranged as an extension to a path that includes the first terminal, the first resistive film, and the second terminal; and a bypass switch arranged in parallel with the detection resistor. With such an arrangement, when the panel voltage is to be detected by means of the voltage detection unit, the bypass switch may be turned on. When the panel current is to be detected by means of the current detection unit, the bypass switch may be turned off. Also, a value that corresponds to a voltage drop that occurs at the detection resistor may be output as a value which represents the panel current.

With such an embodiment, the panel current can be measured while removing the effects of the detection resistor on the panel voltage.

Yet another embodiment of the present invention relates to a touch panel input apparatus. The touch panel input apparatus comprises: a touch panel comprising a first terminal, a second terminal, a third terminal, a first resistive film arranged such that one edge thereof is connected to the first terminal and an edge that is opposite to the aforementioned one edge is connected to the second terminal, and a second resistive film arranged with a gap between it and the first resistive film such that one edge thereof is connected to the third terminal; and a control circuit according to any one of the above-described embodiments, configured to control the touch panel.

Yet another embodiment of the present invention relates to an electronic device. The electronic device comprises the above-described touch panel input apparatus.

2. An embodiment of the present invention relates to a control circuit for a touch panel. The touch panel comprises: a first terminal; a second terminal; a third terminal; a first resistive film arranged such that one edge thereof is connected to the first terminal and an edge that is opposite to the aforementioned one edge is connected to the second terminal; and a second resistive film arranged with a gap between it and the first resistive film such that one edge thereof is connected to the third terminal. The control circuit comprises: a voltage generating unit configured to apply a predetermined first bias voltage and a predetermined second bias voltage to the first and second terminals, respectively; a voltage detection unit configured to detect a panel voltage that occurs at the third terminal; a current detection unit configured to detect a panel current that flows through a path including the first terminal, the first resistive film, and the second terminal; and a coordinate determination unit configured to determine the coordinates touched by the user, based upon the panel voltage and the panel current thus detected. The voltage generating unit comprises: a regulator which includes an output transistor provided as an extension to a path on the first terminal side that includes the first terminal, the first resistive film, and the second terminal, and which is configured to apply the first bias voltage to the first terminal. The current detection unit comprises: a detection transistor connected to the output transistor in a current mirror manner, and a detection resistor arranged on a path of the detection transistor. The current detection unit is configured to output a value that corresponds to a voltage drop that occurs at the detection resistor as a value which represents the panel current.

When the user touches multiple points on the touch panel, the combined resistance value of a path from the first terminal to the second terminal is reduced, and accordingly, the panel current changes according to the reduction in the combined resistance. By monitoring the panel current, such an embodiment is capable of appropriately detecting a multi-touch state. Furthermore, such an arrangement is capable of determining the coordinates of such multiple points. Furthermore, the detection resistor configured to detect the panel current is arranged on a separate path, and is not on the path that includes the first terminal, the first resistive film, and the second terminal. Thus, such an arrangement is capable of detecting the panel current without having an effect on the panel voltage.

Another embodiment of the present invention also relates to a control circuit for a touch panel. The touch panel comprises: a first terminal; a second terminal; a third terminal; a fourth terminal; a first resistive film arranged such that one edge thereof is connected to the first terminal and an edge that is opposite to the aforementioned one edge is connected to the second terminal; and a second resistive film arranged with a gap between it and the first resistive film such that one edge thereof is connected to the third terminal and an edge that is opposite to the aforementioned one edge is connected to the fourth terminal. The control circuit comprises: a voltage generating unit configured to apply a predetermined first bias voltage and a predetermined second bias voltage to respectively the first and second terminals and set the third and fourth terminals to a high-impedance state in a first state, and to apply a predetermined first bias voltage and a predetermined second bias voltage to respectively the third and fourth terminals and set to the first and second terminals to a high-impedance state in a second state; a voltage detection unit configured to detect a panel voltage that occurs at one of the third and fourth terminals in the first state, and to detect a panel voltage that occurs at one of the first and second terminals in the second state; a current detection unit configured to detect, in the first state, a panel current that flows through a path including the first terminal, the first resistive film, and the second terminal, and to detect, in the second state, a panel current that flows through a path including the third terminal, the second resistive film, and the fourth terminal; and a coordinate determination unit configured to determine coordinates touched by the user, based upon the values of the panel voltage and the panel current thus detected. The voltage generating unit comprises: a regulator which includes an output transistor, and which is configured to generate the first bias voltage; and a selector which is arranged such that the first bias voltage is received via an input terminal thereof, a first output terminal thereof is connected to the first terminal, and a second output terminal thereof is connected to the third terminal, and which is configured such that the first output terminal side is on in the first state, and the second output terminal side is on in the second state. The current detection unit comprises: a detection transistor connected to the output transistor in a current mirror manner; and a detection resistor arranged on a path of the detection transistor. The current detection unit is configured to output a value that corresponds to a voltage drop that occurs at the detection resistor as a value which represents the panel current.

Such an embodiment is capable of detecting a multi-touch state and determining multiple coordinates. Furthermore, with such an arrangement, the detection resistor configured to detect the panel current is not directly connected to the touch panel. Thus, such an arrangement is capable of detecting the panel current without having an effect on the panel voltage.

Yet another embodiment also relates to a control circuit. With such an embodiment, a voltage detection unit is configured to detect each of the panel voltages that respectively occur at the third and fourth terminals in the first state, and to detect each of the panel voltages that respectively occur at the first and second terminals in the second state;

Also, the current detection unit may be configured to allow the mirror ratio between the output transistor and the detection transistor to be switched according to whether the state is the first state or the second state.

Also, the current detection unit may be configured to allow the resistance value of the detection resistor to be switched according to whether the state is the first state or the second state.

In a case in which there is a large difference in the length of the touch panel between the vertical direction and the horizontal direction (i.e., the aspect ratio), it is assumed that there is a difference in the combined resistance between the vertical direction and the horizontal direction. Accordingly, in some cases, there is a difference in the panel current range between the X direction and the Y direction. In this case, by switching the mirror ratio or the resistance value of the detection resistor, such an arrangement is capable of providing matching voltage ranges for the voltage drop that occurs at the detection resistor.

Also, when the value of the panel current is greater than a predetermined value, the coordinate determination unit may judge that the user touched multiple points.

Also, when the user touches two points, the interval between the two coordinates may be determined based upon the value of the panel current. Also, the interval between the two coordinates may be determined to be a value which increases according to an increase in the panel current.

When the user touches two points, a portion of the first resistive film between the two points and a portion of the second resistive film therebetween are connected in parallel. Accordingly, the combined resistance of a path from the first terminal to the second terminal drops, thereby increasing the panel current. The length of the region where the first resistive film and the second resistive film are connected in parallel increases according to an increase in the distance between the two points, and thus the combined resistance drops, and the panel current increases. Thus, such an arrangement is capable of determining the interval between the two coordinates, based upon the panel current.

Also, the interval between the coordinates may be determined based upon the difference between the panel current measured when the user does not touch the panel and the panel current measured when the user touches the panel.

Also, the coordinate determination unit may determine the midpoint between the two coordinates based upon the panel voltage. Also, the coordinate determination unit may determine the coordinates of one of the two points by adding, to the midpoint coordinates, a value that corresponds to the interval between the two coordinates. Also, the coordinate determination unit may determine the coordinates of the other of the two points by subtracting, from the midpoint coordinates, a value that corresponds to the interval between the two coordinates.

Yet another embodiment of the present invention relates to a touch panel input apparatus. The touch panel input apparatus comprises: a touch panel; and any one of the above-described control circuits, configured to control the touch panel.

Yet another embodiment of the present invention relates to an electronic device. The electronic device includes the above-described touch panel input apparatus.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, a state represented by the phrase "the member A is connected to the member B" includes a state in which the member A is indirectly connected to the member B via another member that does not affect the electric connection therebetween, in addition to a state in which the member A is physically and directly connected to the member B.

Similarly, a state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

First Embodiment

Figure 1:
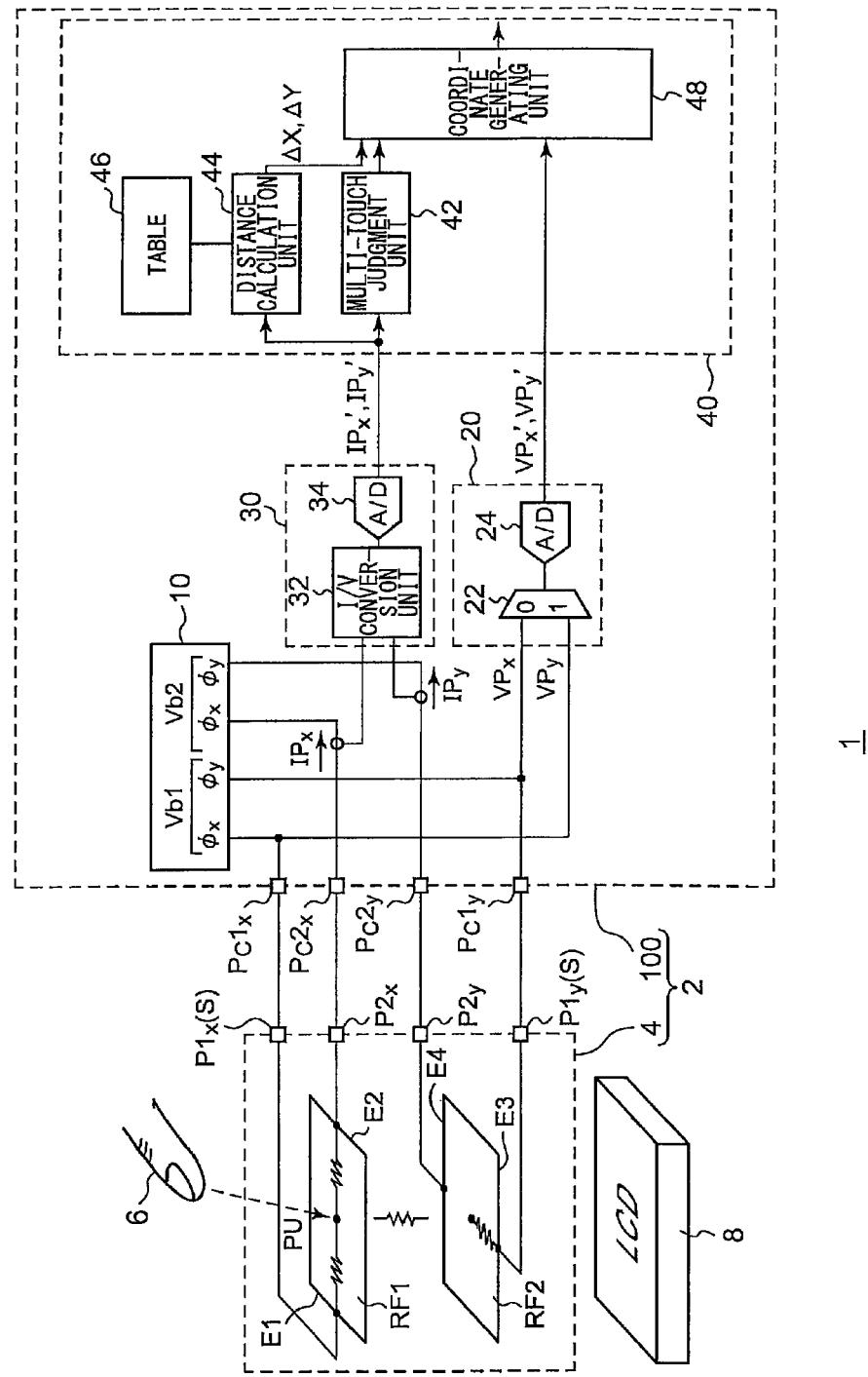
FIG. 1 is a block diagram which shows a configuration of an electronic device including a touch panel input apparatus according to a first embodiment.

FIG. 1 is a block diagram which shows a configuration of an electronic device 1 including a touch panel input apparatus (which will simply be referred to as the "input apparatus") 2 according to a first embodiment. The input apparatus 2 is arranged on a surface layer of an LCD (Liquid Crystal Display) 8, and functions as a touch panel. The input apparatus 2 identifies the X-coordinates and the Y-coordinates of points (positions) touched by the user via a finger, a pen, or the like (which will collectively be referred to as the "finger 6" hereafter).

The input apparatus 2 includes a touch panel 4 and a control circuit 100. The touch panel 4 is configured as a four-line (four-terminal) resistive film touch panel. The touch panel 4 has a typical configuration, and accordingly, a brief description thereof will be made below.

The touch panel 4 includes a first terminal P1x through a fourth terminal P2y, a first resistive film RF1, and a second resistive film RF2.

The first resistive film RF1 and the second resistive film RF2 are arranged such that the one is overlaid on the other with a gap between them in the Z-axis direction, which is orthogonal to the X-axis and the Y-axis. An edge E1 which is orthogonal to the X-axis of the first resistive film RF1 is connected to the first terminal P1x. An edge E2, which is opposite to the edge E1, is connected to the second terminal P2x. The third terminal P1y is connected to an edge E3, which is parallel to the X-axis of the second resistive film RF2. The fourth terminal P2y is connected to an edge E4, which is opposite to the edge E3 of the second resistive film RF2.

The above is the structure of the touch panel 4.

The control circuit 100 detects a position touched by the user while switching states in a time sharing manner between a first state φx in which the X direction coordinate is detected and a second state φy in which the Y direction coordinate is detected.

The control circuit 100 includes a first terminal Pc1x through a fourth terminal Pc2y, a voltage generating unit 10, a voltage detection unit 20, a current detection unit 30, and a computation unit 40.

The first terminal Px1x through the fourth terminal Pc2y are connected to the corresponding terminals on the touch panel 4 side, i.e., are respectively connected to the first terminal P1x through the fourth terminal P2y.

First, description will be made regarding the configuration for detecting the X direction coordinate (X-coordinate).

In the first state φx, the voltage generating unit 10 applies a predetermined first bias voltage Vb1 and a predetermined second bias voltage Vb2 to the first terminal P1x and the second terminal P2x, respectively. Here, the relation Vb1>Vb2 is satisfied. The second bias voltage Vb2 is preferably set to the ground voltage (0 V). Furthermore, in the first state, the voltage generating unit 10 sets each of the third terminal P1y and the fourth terminal P2y to the high-impedance state.

In the first state φx, the voltage detection unit detects a panel voltage VPx that occurs at the third terminal P1y. The voltage detection unit 20 includes an A/D converter 24, and converts the panel voltage VPx thus detected into a digital signal VPx'.

In the first state φx, the current detection unit detects a panel current IPx that flows through a path including the first terminal P1x, the first resistive film RF1, and the second terminal P2x. The current detection unit 30 includes an I/V conversion unit 32 configured to convert the panel current IPx into a voltage signal, and an A/D converter 34 configured to convert the voltage signal into a digital signal IPx'.

The computation unit (coordinate determination unit) 40 determines the X-coordinate of the point PU touched by the user, based upon the panel voltage VPx' and the panel current IPx'.

Next, description will be made regarding a configuration for detecting the Y direction coordinate (Y-coordinate).

In the second state φy, the voltage generating unit 10 applies a predetermined first bias voltage Vb1 and a predetermined second bias voltage Vb2 to the third terminal P1y and the fourth terminal P2y, respectively. Furthermore, in the second state, the voltage generating unit 10 sets each of the first terminal P1x and the second terminal P2x to the high-impedance state. The first bias voltage Vb1 used in the first state may be the same as that used in the second state, or they may be different. Description will be made below regarding an arrangement in which the first voltage Vb1 used in the first state is the same as that used in the second state. The same can be said of the second bias voltage Vb2.

In the second state φy, the voltage detection unit 20 detects a panel voltage VPy that occurs at the first terminal P1x. The A/D converter 24 converts the panel voltage VPy thus detected into a digital signal VPy'. The voltage detection unit 20 includes a two-input selector 22. The first input terminal (0) of the selector 22 is connected to the third terminal P1y, and the second input terminal (1) is connected to the first terminal P1x. In the first state φx, the first input (0) side of the selector 22 is on, and in the second state φy, the second input (1) side of the selector 22 is on.

It should be noted that, in the first state φx, the voltage detection unit 20 may measure the voltage that occurs at the fourth terminal P2y as the panel voltage VPx, instead of or in addition to the voltage that occurs at the third terminal P1y. Similarly, in the second state φy, the voltage detection unit 20 may measure the voltage that occurs at the second terminal P2x as the panel voltage VPy, instead of or in addition to the voltage that occurs at the first terminal P1x.

In the second state φy, the current detection unit 30 detects a panel current IPy that flows through a path including the third terminal P1y, the second resistive film RF2, and the fourth terminal P2y. The I/V conversion unit 32 converts the panel current IPy into a voltage signal. The A/D converter 34 converts the voltage signal thus converted into a digital value IPy'.

The computation unit (coordinate determination unit) 40 determines the Y-coordinate of the point PU touched by the user, based upon the panel voltage VPy' and the panel current IPy'.

That is to say, in the first state φx, the third terminal P1y functions as a terminal for detecting the panel voltage VPx. In the second state φy, the third terminal P1y functions as a terminal for applying the bias voltage Vb2 to the second resistive film RF2. Similarly, in the second state φy, the first terminal P1x functions as a terminal for detecting the panel voltage VPy. In the first state φx, the first terminal P1x functions as a terminal for applying the bias voltage Vb1 to the first resistive film RF1. It should be noted that the fourth terminal P2y may be used as a terminal for detecting the panel voltage VPx instead of the first terminal P1x. Also, the second terminal P1y may be used as a terminal for detecting the panel voltage VPy instead of the first terminal P1x.

The above is the overall configuration of the control circuit 100. Next, description will be made regarding a mechanism for coordinate detection by means of the control circuit 100. Description will be made below regarding a mechanism for detecting the X-coordinate in the first state φx. The same can be said of detection of the Y-coordinate.

Figure 2A:
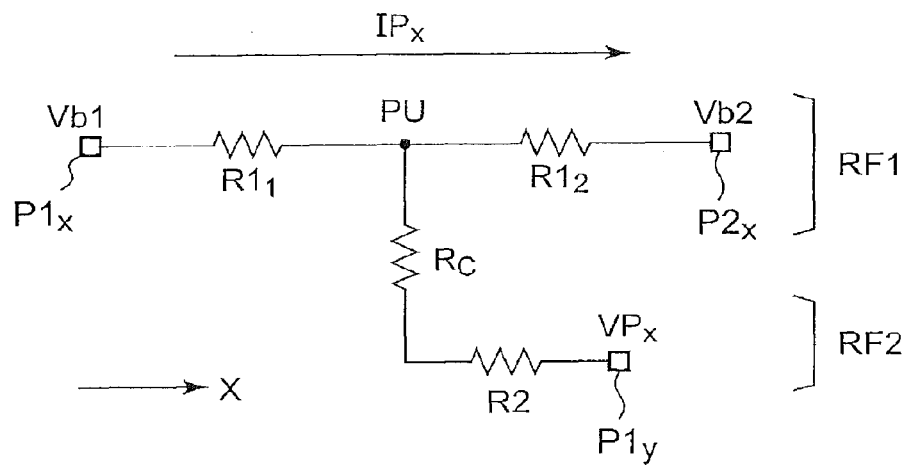
FIGS. 2A and 2B are equivalent circuit diagrams in the single-touch state and the multi-touch state, respectively.
Figure 2B:
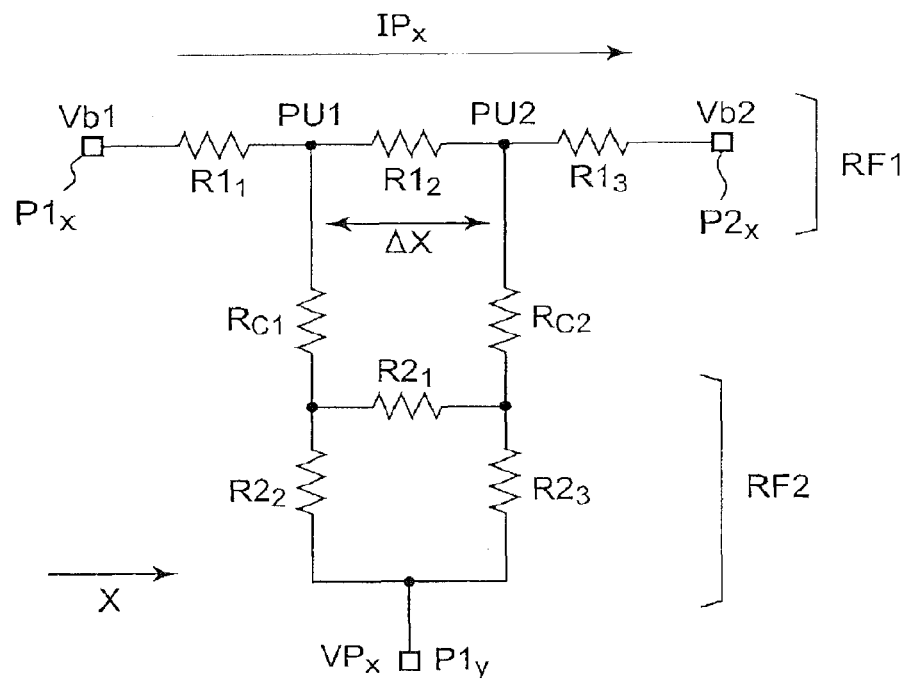

FIGS. 2A and 2B are equivalent circuit diagrams which show a circuit for the single-touch state and a circuit for the multi-touch state, respectively. It should be noted that, in actuality, each resistor shown in each drawing is the result of distributed parameters. However, discrete resistor elements are shown in the drawings for simplicity of description.

[Single-Touch State]

Referring to FIG. 2A, when the user touches a single point PU, the first resistive film RF1 is partitioned into a resistor R11 that corresponds to a region between the first terminal P1x and the point PU and a resistor R12 that corresponds to a region between the point PU and the second terminal P2x. The first resistive film RF1 and the second resistive film RF2 are in contact at the point PU, and the contact resistance thereof is represented by Rc. The resistance of a path from the point PU of the second resistive film RF2 to the third terminal P1y is represented by R2.

The electric potential at the point PU is a voltage obtained by dividing the voltage difference between the bias voltage Vb1 and the bias voltage Vb2 by the resistors R11 and R12. Accordingly, the electric potential at the point PU represents the X-coordinate of the point PU. The electric potential at the point PU is approximately the same as that at the third terminal P1y. That is to say, the panel voltage VPx that occurs at the third terminal P1y represents the X-coordinate of the point PU.

Known techniques can be employed as an algorithm used to derive the X-coordinate based upon the panel voltage VPx. The algorithm used in the present invention is not restricted in particular.

For the impedance on the control circuit 100 side seen at the third terminal P1y to be sufficiently high, the panel current IPx flows through a path formed of the first terminal P1x, the resistors R11 and R12, and the second terminal P2x. That is to say, the impedance Zs of a path between the first terminal P1x and the second terminal P2x is represented by Zs=R11+R12. The impedance Zs can be considered to be constant regardless of the position of the contact point PU. Furthermore, the impedance Zs is approximately the same as the impedance Zo when the user does not touch the panel. That is to say, the relation Zs≈Zo is satisfied.

Hereafter, the impedance in the non-contact state will not be distinguished from the impedance in the single-touch state in particular. These impedances will collectively be referred to as the "reference impedance Zo".

The panel current IPx that flows from the first terminal P1x to the second terminal P2x in either the single-touch state or in the non-contact state is represented by IPxo=(Vb1−Vb2)/Zo.

The panel current IPxo will be referred to as the "reference panel current".

[Multi-Touch State]

Referring to FIG. 2B, when the user touches two points PU1 and PU2, the first resistive film RF1 is partitioned into a resistor R11 that corresponds to a region between the first terminal P1x and the point PU1, a resistor R12 that corresponds to a region between the point PU1 and the point PU2, and a resistor R13 that corresponds to a region between the point PU2 and the second terminal P2x. The first resistive film RF1 and the second resistive film RF2 are in contact at the points PU1 and PU2. The contact resistances at the points PU1 and PU2 are represented by Rc1 and Rc2.

With regard to the second resistive film RF2, the resistance that corresponds to a region between the points PU1 and PU2 is represented by R21, the resistance of a path from the point PU1 to the third terminal P1y is represented by R22, and the resistance of a path from the point PU2 to the third terminal P1y is represented by R23.

The panel current IPx in the multi-touch state is determined by the combined impedance Zm that corresponds to a path between the first terminal P1x and the second terminal P2x. The relation between the combined impedance Zm and the reference impedance Zo in either the non-contact state or the single-touch state is represented by Zm<Zo.

Thus, the relation between the panel current IPxm in the multi-touch state and the reference panel current IPxo is represented by IPxm>IPxo.

That is to say, by monitoring the panel current IPx, and by comparing the panel current IPx thus monitored with the reference panel current IPxo, such an arrangement is capable of distinguishing between the multi-touch state and the single-touch state (and the non-contact state).

The electric potentials at the points PU1 and PU2 are each voltages obtained by dividing the voltage difference between the bias voltages Vb1 and Vb2 with the resistors R11, R12, and R13 and other resistance components. Accordingly, the electric potentials at the points PU1 and PU2 each change according to their X-coordinates. Thus, the panel voltage VPx3 that occurs at the third terminal P1y also changes according to the positions of the points PU1 and PU2. Accordingly, when the multi-touch state is detected, the coordinates of the points PU1 and PU2 can be estimated based upon the panel voltage VPx.

More specifically, an X-coordinate X3 determined based upon the panel voltage VPx3 using the same algorithm as in the single-touch state represents a point positioned between the points PU1 and PU2 touched by the user. That is to say, with the X-coordinates of the points PU1 and PU2 actually touched by the user as X1 and X2, the relation X1<X3<X2 is satisfied.

That is to say, the coordinates of the points PU1 and PU2 can be estimated using the coordinate X3, the derivation of which is based upon the panel voltage VPx3. Description will be made later regarding the estimation algorithm.

As described above, with the control circuit 100 according to the first embodiment, the panel current IPx is monitored in addition to the panel voltage VPx, and processing is performed on a combination of the panel voltage VPx and the panel current IPx thus monitored. Thus, such an arrangement is capable of determining the coordinates of user touch points not only in the single-touch state, but also in the multi-touch state.

Next, description will be made regarding a specific example configuration of the computation unit 40 and the processing operation thereof.

The computation unit 40 includes a multi-touch judgment unit 42, a distance calculation unit 44, a table 46, and a coordinate generating unit 48.

Figure 3:
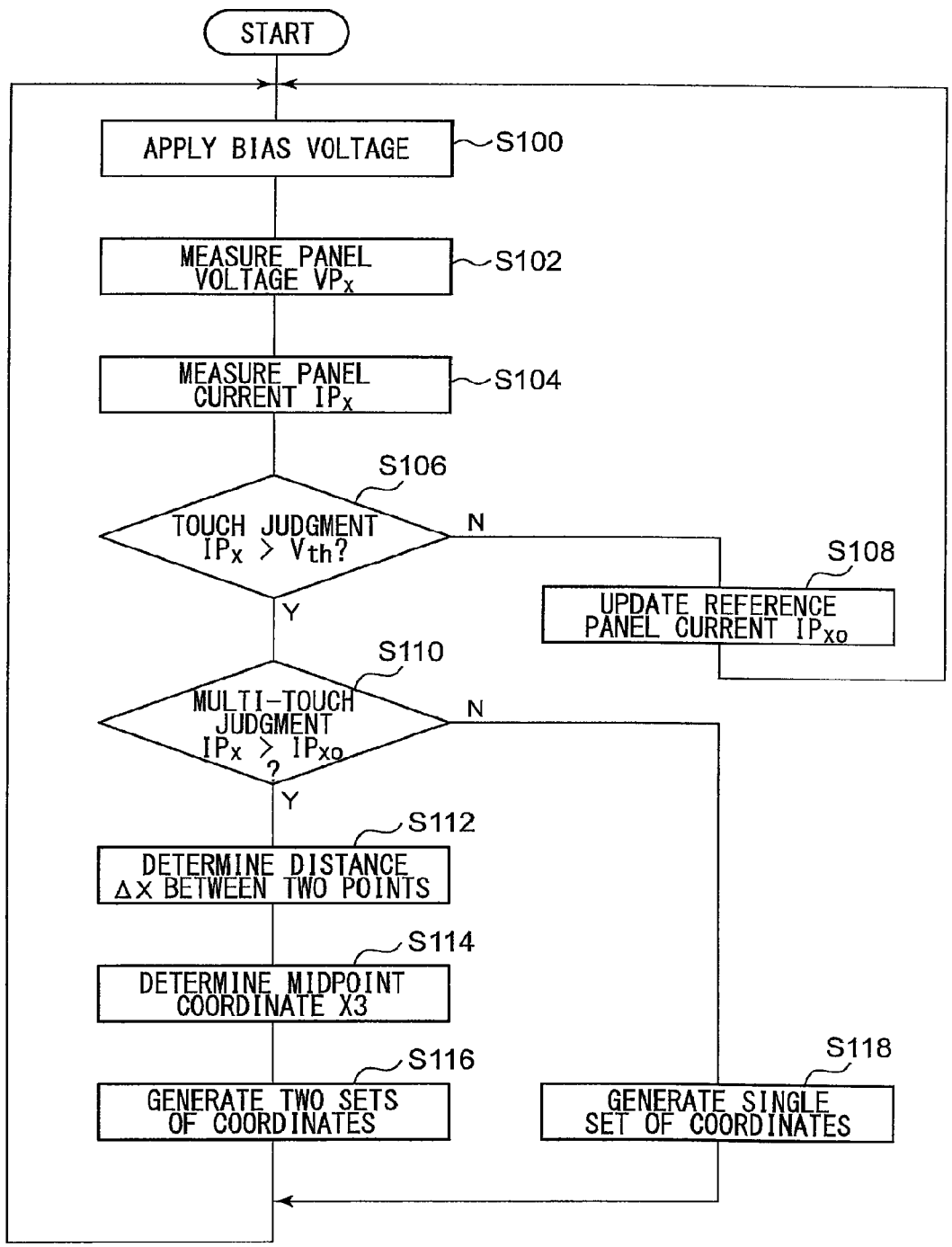
FIG. 3 is a flow chart which shows the processing performed by the control circuit shown in FIG. 1.

FIG. 3 is a flow chart which shows processing performed by the control circuit 100 shown in FIG. 1. The flow shown in FIG. 3 shows the processing used to determine the X-coordinate in the first state φx. It should be noted that, to such an extent that the processing is not adversely affected, the sequence of the steps can be rearranged, or several steps can be simultaneously executed in a parallel manner.

First, the voltage generating unit 10 applies the bias voltages Vb1 and Vb2 to the first terminal P1$x$ and the second terminal P2$x$, respectively (S100). In this state, the voltage detection unit 20 measures the panel voltage VPx (S102), and the current detection unit 30 measures the panel current IPx (S104).

The computation unit 40 receives the digital values VPx' and IPx' that correspond to the panel voltage VPx and the panel current IPx thus obtained.

Subsequently, judgment is made whether or not the user touched the panel (S106). When the user touches a point having a low X-coordinate (in the vicinity of the edge E1), the panel voltage VPx is high, and when the user touches a point having a high X-coordinate (in the vicinity of the edge E2), the panel voltage VPx is low. In the non-contact state, no voltage is applied to the third terminal P1$y$. Accordingly, in this state, the panel voltage VPx is approximately zero.

Thus, the coordinate generating unit 48 judges whether or not the user touched the panel, by comparing the panel voltage VPx with a predetermined threshold voltage Vth. The threshold voltage Vth is set to a value in the vicinity of 0 V.

When VPx>Vth ("YES" in S106), judgment is made that the user touched the panel. Subsequently, the multi-touch judgment unit 42 judges whether or not a multi-touch operation was performed (S110). Judgment of whether or not a multi-touch operation was performed is made by comparing the panel current IPx with a predetermined reference current IPxo, as described above.

When IPx<IPxo ("NO" in S110), the multi-touch judgment unit 42 judges that a single-touch operation was performed, and notifies the coordinate generating unit 48 of this judgment result. The coordinate generating unit 48 determines the X-coordinate based upon the panel voltage VPx (S118).

When IPx>IPxo ("YES" in S110), the multi-touch judgment unit 42 judges that a multi-touch operation was performed, and notifies the distance calculation unit 44 and the coordinate generating unit 48 of this judgment result.

If judgment is made that a multi-touch operation was performed, the distance calculation unit 44 determines the distance ΔX between the two points PU1 and PU2 (S112).

The present inventor has come to recognize that there is a correlation between the distance ΔX between the two points PU1 and PU2 and the panel current IPx. That is to say, when the distance ΔX between the two points is zero, the state is equivalent to that of a single-touch operation, and therefore the panel current IPx is approximately the same as the reference current IPxo.

Figure 4A:
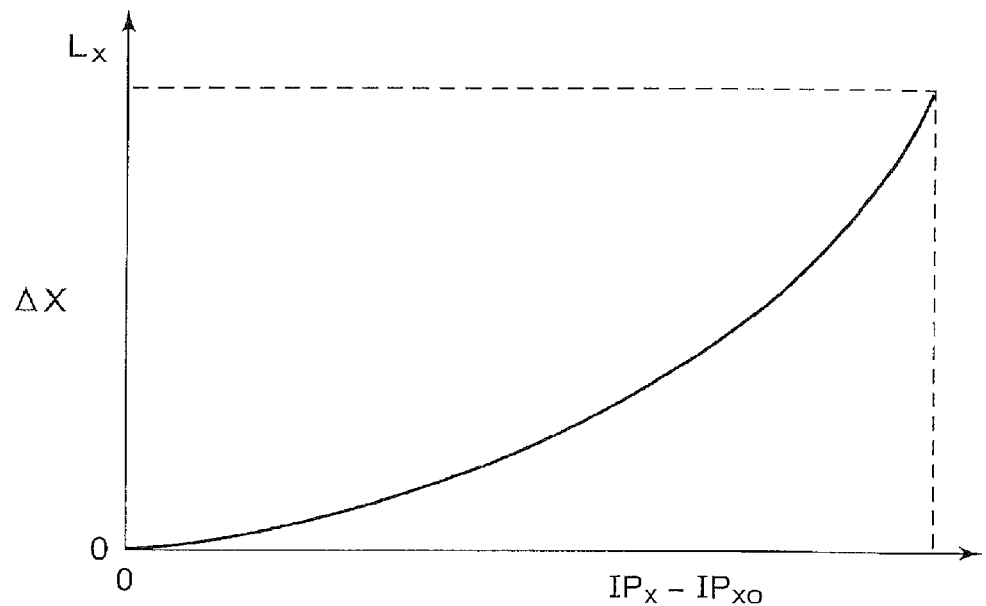
FIGS. 4A and 4B are a graph and a diagram showing the relation between the panel current and the points in the multi-touch state, respectively.
Figure 4B:
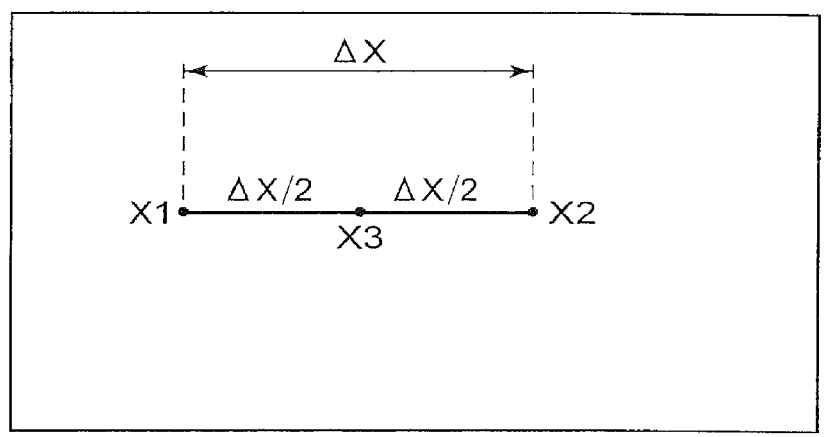

FIGS. 4A and 4B are a graph and a diagram each showing the relation between the panel current and the points in the multi-touch state.

As the distance ΔX between the two points increases, the length of the region which is equivalent to the resistors R12 and R21 connected in parallel increases. Accordingly, the combined impedance Zm of a path between the first terminal P1$x$ and the second terminal P2$x$ drops. Thus, the panel current IPx increases according to the drop in the combined impedance Zm. When the distance ΔX between the two points reaches the length Lx of the panel in the X direction, the panel current exhibits the minimum value IPxmin.

That is to say, there is a one-to-one correspondence between the panel current IPx and the distance ΔX between the two points. In other words, there is a one-to-one correspondence between the panel current IPx and the current difference (IPx−IPxo) between the panel current IPx and the reference current IPxo. FIG. 4A is a graph which shows the relation between the current difference (IPx−IPxo) and the distance ΔX.

The characteristics shown in FIG. 4A should be measured for each touch panel 4. Alternatively, the characteristics shown in FIG. 4A may be calculated by simulation. The table 46 stores the relation between the current difference (IPx−IPxo) and the distance ΔX.

The distance calculation unit 44 determines the distance ΔX to be measured, based upon the panel current IPx with reference to the table 46, and outputs the distance ΔX thus determined to the coordinate generating unit 48. It should be noted that an arrangement may be made in which an approximate analytical equation which represents the characteristics shown in FIG. 4A is stored, and the distance ΔX is obtained by calculation, instead of an arrangement employing the table 46.

The coordinate generating unit 48 receives the data which represent the distance ΔX and the panel voltage VPx3. The coordinate generating unit 48 calculates the X-coordinate X3 that corresponds to the panel voltage VPx3 using the same algorithm as that used in the single-touch state, or an algorithm that is different from that used in the single-touch state. The X-coordinate X3 thus calculated is taken as the midpoint coordinate between the two points (S114).

The coordinate generating unit 48 determines the coordinate PU2 of one of the two points by adding a value ΔX/2, which corresponds to the interval between the two coordinates ΔX (in this example, half the distance ΔX), to the midpoint coordinate X3, and determines the other coordinate PU1 of the two points by subtracting, from the midpoint coordinate X3, the value ΔX/2 which corresponds to the distance ΔX between the two coordinates (S116). FIG. 4B shows this processing. Subsequently, the flow returns to Step S100.

Referring to Step S106 again, when VPx<Vth ("NO" in S106), the coordinate generating unit 48 judges that the panel is in the non-contact state. Subsequently, in Step S104, the multi-touch judgment unit 42 updates the reference panel current IPxo using the panel current IPx thus measured (S108). Subsequently, the flow returns to Step S100.

The above is a specific flow of the processing performed by the control circuit 100.

With the input apparatus 2, the single-touch state and the multi-touch state can be appropriately distinguished. Thus, the input apparatus 2 is capable of generating point coordinates in both states. Furthermore, the input apparatus 2 according to the first embodiment has the following advantages.

In Step S108, the reference panel current IPxo is updated. Thus, such an arrangement reduces the effects of time-related deterioration or fluctuations in temperature on the touch panel 4. That is to say, if the resistance values of the first resistive film RF1, the second resistive film RF2, and the contact resistance therebetween change due to deterioration or fluctuations in temperature, the reference current IPxo also changes according to the change in the resistance values. Accordingly, if a fixed value is used as the value of the reference current IPxo, such an arrangement leads to false detection of the multi-touch state. Alternatively, this leads to error in the distance ΔX between the two points. In contrast, by updating the reference current IPxo in the processing, such an arrangement is capable of appropriately solving such a problem.

Furthermore, such an arrangement in which the distance ΔX between the two points is determined using the current difference (IPx−IPxo) in the multi-touch state has the following advantage. As described above, the impedance of the panel changes due to time-related deterioration or fluctuations in temperature. In this case, even if the user touches the panel at the same coordinates, the panel current IPx changes. In order to solve such a problem, by calculating the current difference, such an arrangement reduces the effects of time-related deterioration and fluctuations in temperature. Thus, such an arrangement provides precise coordinate detection.

Figure 5:
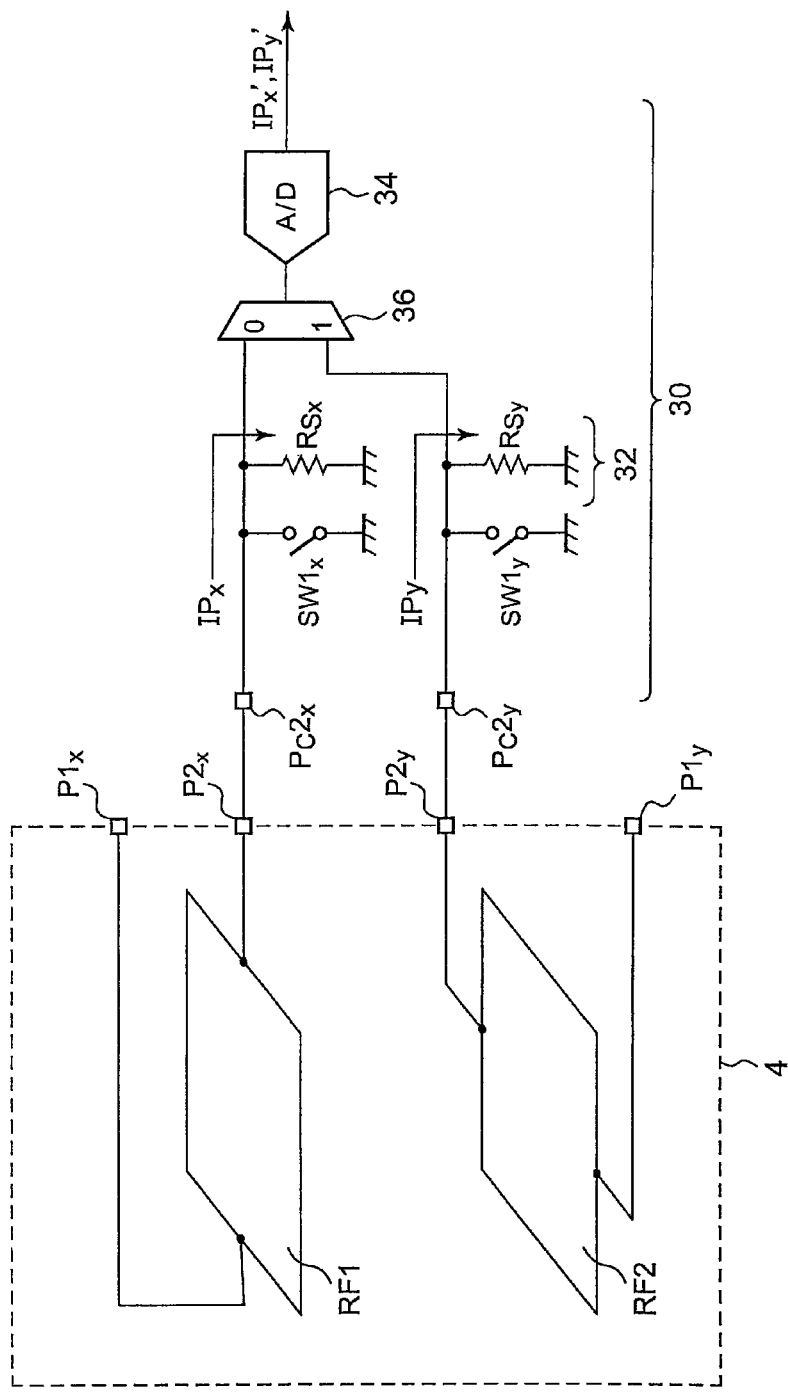
FIG. 5 is a circuit diagram which shows an example configuration of a current detection unit shown in FIG. 1.

FIG. 5 is a circuit diagram which shows an example configuration of the current detection unit 30 shown in FIG. 1. The current detection unit 30 includes detection resistors Rsx and Rsy, bypass switches SW1x and SW1y, a selector 36, and an A/D converter 34. The detection resistors Rsx and Rsy correspond to the I/V conversion unit 32 shown in FIG. 1.

The detection resistor Rsx and the bypass switch SW1x are used to detect the coordinate in the X-axis direction, and the detection resistor Rsy and the bypass switch SW1y are used to detect the coordinate in the Y-axis direction. The circuit blocks used to detect the X-axis coordinate and the Y-axis coordinate have the same configuration. Accordingly, description will be made below only regarding an arrangement used to detect the coordinate in the X-axis direction.

The detection resistor Rsx is provided as an extension to a path that includes the first terminal P1x, the first resistive film RF1, and the second terminal P2x. Specifically, one terminal of the detection resistor Rsx is grounded, and is set to a fixed electric potential. The other terminal thereof is connected to the second terminal Pc2x.

The bypass switch SW1x is arranged in parallel with the corresponding detection resistor Rsx. Specifically, one terminal of the bypass switch SW1x is grounded, and the other terminal thereof is connected to the second terminal Pc2x.

When the voltage detection unit 20 detects the panel voltage VPx, the bypass switch SWx is turned on. In this state, the detection resistor Rs does not affect the combined impedance of the touch panel 4. Thus, such an arrangement is capable of measuring the panel voltage VPx with high precision.

When the current detection unit 30 detects the panel current IPx, the bypass switch SWx is turned off. In this state, a voltage drop which is proportional to the panel current IPx (Rx×IPx) occurs at the detection resistor Rsx. When the coordinate in the X-axis direction is to be detected, the terminal (0) side of the selector 36 is on, and when the coordinate in the Y-axis direction is to be detected, the terminal (1) side of the selector 36 is on. The A/D converter 34 converts the voltage drop that occurs at the detection resistor Rsx into a digital value. The digital value thus converted represents a value that corresponds to the panel current IPx.

It should be noted that, when the ground voltage is used as the second bias voltage Vb2, such an arrangement allows the bypass switch SW1x to function as the voltage generating unit 10. That is to say, when the second bias voltage Vb2 is to be applied to the second terminal P2x, the bypass switch SW1x should be turned on. The same can be said of the bypass switch SW1y.

Second Embodiment

Figure 6:
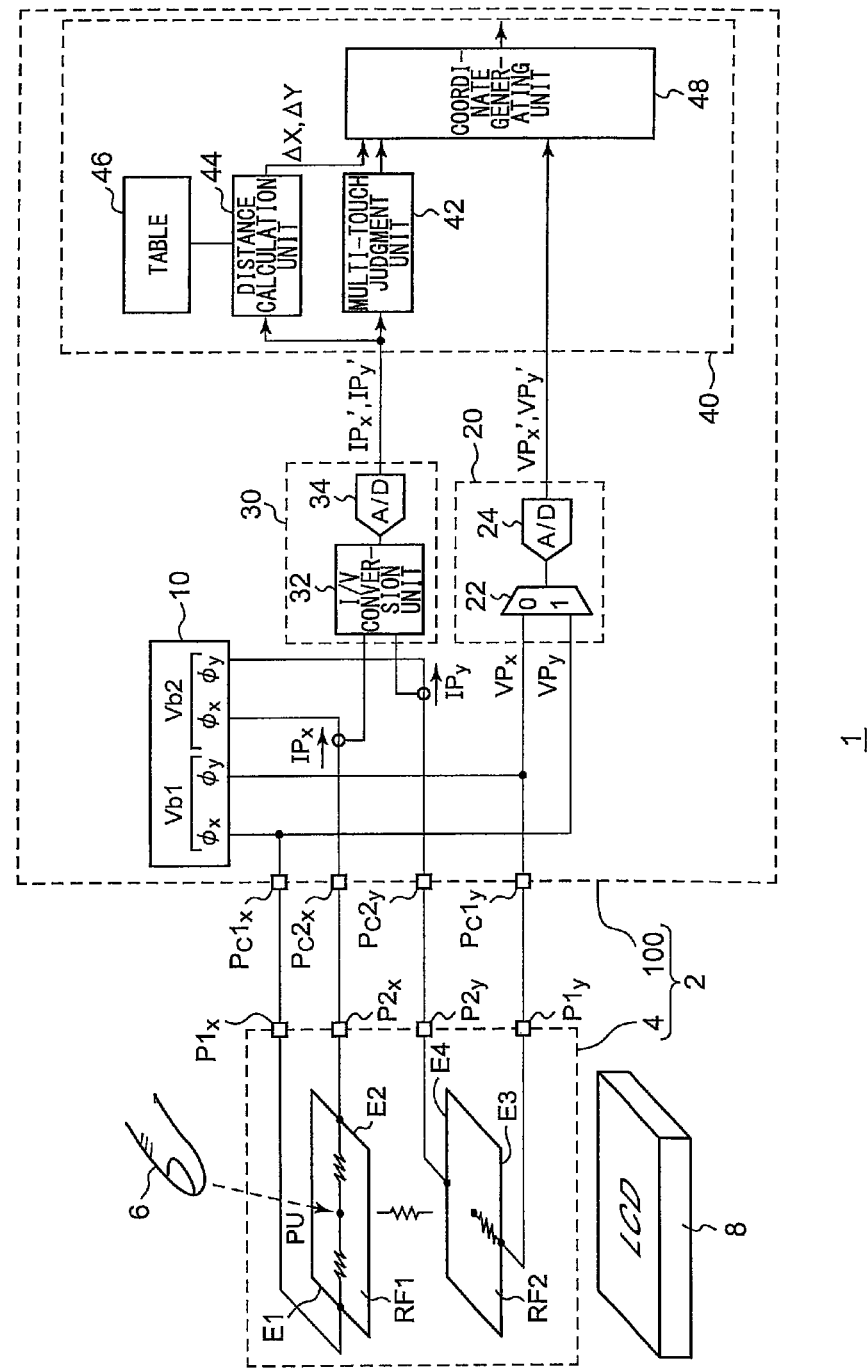
FIG. 6 is a block diagram which shows a configuration of an electronic device including a touch panel input apparatus according to a second embodiment.

FIG. 6 is a block diagram which shows a configuration of an electronic device 1 including a touch panel input apparatus (which will simply be referred to as the "input apparatus") 2 according to a second embodiment. The input apparatus 2 is arranged on a surface layer of an LCD (Liquid Crystal Display) 8, and functions as a touch panel. The input apparatus 2 identifies the X-coordinates and the Y-coordinates of points (positions) touched by the user via a finger, a pen, or the like (which will collectively be referred to as the "finger 6" hereafter).

The input apparatus 2 includes a touch panel 4 and a control circuit 100. The touch panel 4 is configured as a four-line (four-terminal) resistive film touch panel. The touch panel 4 has a typical configuration, and accordingly, a brief description thereof will be made below.

The touch panel 4 includes a first terminal P1x through a fourth terminal P2y, a first resistive film RF1, and a second resistive film RF2.

The first resistive film RF1 and the second resistive film RF2 are arranged such that the one is overlaid on the other with a gap between them in the Z-axis direction, which is orthogonal to the X-axis and the Y-axis. An edge E1 which is orthogonal to the X-axis of the first resistive film RF1 is connected to the first terminal P1x. An edge E2, which is opposite to the edge E1, is connected to the second terminal P2x. The third terminal P1y is connected to an edge E3, which is parallel to the X-axis of the second resistive film RF2. The fourth terminal P2y is connected to an edge E4, which is opposite to the edge E3 of the second resistive film RF2.

The above is the structure of the touch panel 4.

The control circuit 100 detects a position touched by the user while switching states in a time sharing manner between a first state φx in which the X direction coordinate is detected and a second state φy in which the Y direction coordinate is detected.

The control circuit 100 includes a first terminal Pc1x through a fourth terminal Pc2y, a voltage generating unit 10, a voltage detection unit 20, a current detection unit 30, and a computation unit 40.

The first terminal Px1x through the fourth terminal Pc2y are connected to the corresponding terminals on the touch panel 4 side, i.e., are respectively connected to the first terminal P1x through the fourth terminal P2y.

First, description will be made regarding the configuration for detecting the X direction coordinate (X-coordinate).

In the first state φx, the voltage generating unit 10 applies a predetermined first bias voltage Vb1 and a predetermined second bias voltage Vb2 to the first terminal P1x and the second terminal P2x, respectively. Here, the relation Vb1>Vb2 is satisfied. The second bias voltage Vb2 is preferably set to the ground voltage (0 V). Furthermore, in the first state, the voltage generating unit 10 sets each of the third terminal P1y and the fourth terminal P2y to the high-impedance state.

In the first state φx, the voltage detection unit detects a panel voltage VPx that occurs at the third terminal P1y. The voltage detection unit 20 includes an A/D converter 24, and converts the panel voltage VPx thus detected into a digital signal VPx'.

In the first state φx, the current detection unit 30 detects a panel current IPx that flows through a path including the first terminal P1x, the first resistive film RF1, and the second terminal P2x. The current detection unit 30 includes an I/V conversion unit 32 configured to convert the panel current IPx into a voltage signal, and an A/D converter 34 configured to convert the voltage signal into a digital signal IPx'.

The computation unit (coordinate determination unit) 40 determines the X-coordinate of the point PU touched by the user, based upon the panel voltage VPx' and the panel current IPx'.

Next, description will be made regarding a configuration for detecting the Y direction coordinate (Y-coordinate).

In the second state φy, the voltage generating unit 10 applies a predetermined first bias voltage Vb1 and a predetermined second bias voltage Vb2 to the third terminal P1y and the fourth terminal P2y, respectively. Furthermore, in the second state φy, the voltage generating unit 10 sets each of the first terminal P1x and the second terminal P2x to the high-impedance state. The first bias voltage Vb1 used in the first state may be the same as that used in the second state, or they may be different. Description will be made below regarding an arrangement in which the first voltage Vb1 used in the first state is the same as that used in the second state. The same can be said of the second bias voltage Vb2.

In the second state φy, the voltage detection unit 20 detects a panel voltage VPy that occurs at the first terminal P1x. The A/D converter 24 converts the panel voltage VPy thus detected into a digital signal VPy'. The voltage detection unit 20 includes a two-input selector 22. The first input terminal (0) of the selector 22 is connected to the third terminal P1y, and the second input terminal (1) is connected to the first terminal P1x. In the first state φx, the first input (0) side of the selector 22 is on, and in the second state φy, the second input (1) side of the selector 22 is on.

It should be noted that, in the first state φx, the voltage detection unit 20 may measure the voltage that occurs at the fourth terminal P2y as the panel voltage VPx, instead of or in addition to the voltage that occurs at the third terminal P1y. Similarly, in the second state φy, the voltage detection unit 20 may measure the voltage that occurs at the second terminal P2x as the panel voltage VPy, instead of or in addition to the voltage that occurs at the first terminal P1x.

In the second state φy, the current detection unit 30 detects a panel current IPy that flows through a path including the third terminal P1y, the second resistive film RF2, and the fourth terminal P2y. The I/V conversion unit 32 converts the panel current IPy into a voltage signal. The A/D converter 34 converts the voltage signal thus converted into a digital value IPy'.

The computation unit (coordinate determination unit) 40 determines the Y-coordinate of the point PU touched by the user, based upon the panel voltage VPy' and the panel current IPy'.

That is to say, in the first state φx, the third terminal P1y functions as a terminal for detecting the panel voltage VPx. In the second state φy, the third terminal P1y functions as a terminal for applying the bias voltage Vb2 to the second resistive film RF2. Similarly, in the second state φy, the first terminal P1x functions as a terminal for detecting the panel voltage VPy. In the first state φx, the first terminal. P1x functions as a terminal for applying the bias voltage Vb1 to the first resistive film RF1. It should be noted that the fourth terminal P2y may be used as a terminal for detecting the panel voltage VPx instead of the first terminal P1x. Also, the second terminal P1y may be used as a terminal for detecting the panel voltage VPy instead of the first terminal P1x.

The above is the overall configuration of the control circuit 100. Next, description will be made regarding a mechanism for coordinate detection by means of the control circuit 100. Description will be made below regarding a mechanism for detecting the X-coordinate in the first state φx. The same can be said of detection of the Y-coordinate.

Figure 7A:
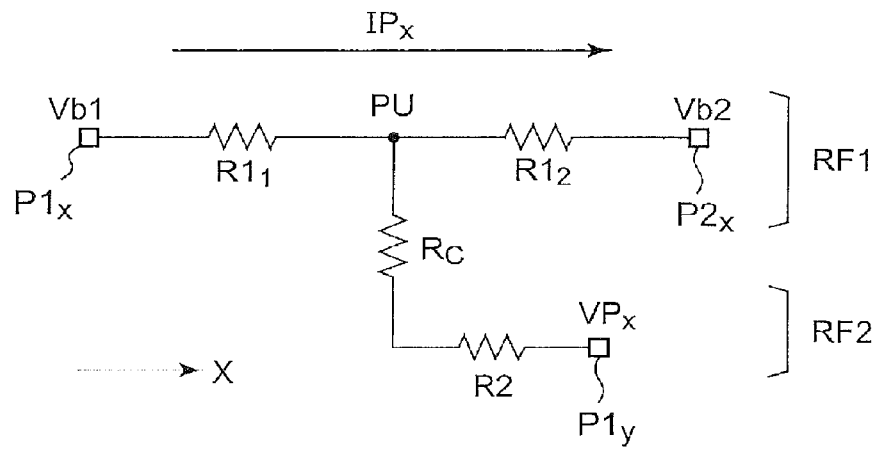
FIGS. 7A and 7B are equivalent circuit diagrams showing the configurations in the single-touch state and the multi-touch state, respectively.
Figure 7B:
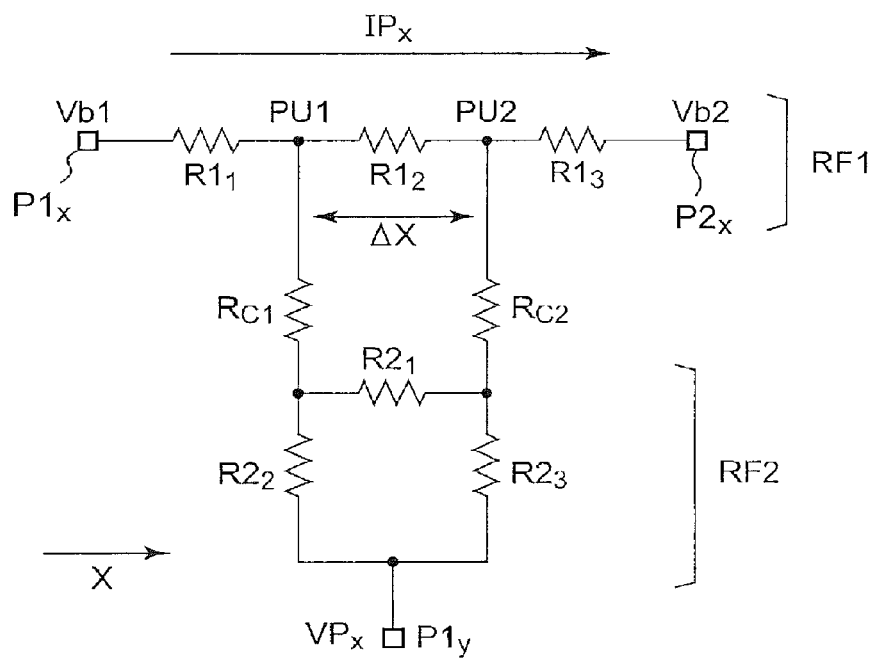

FIGS. 7A and 7B are equivalent circuit diagrams which show a circuit for the single-touch state and a circuit for the multi-touch state, respectively. It should be noted that, in actuality, each resistor shown in each drawing is the result of distributed parameters. However, discrete resistor elements are shown in the drawings for simplicity of description.

[Single-Touch State]

Referring to FIG. 7A, when the user touches a single point PU, the first resistive film RF1 is partitioned into a resistor R11 that corresponds to a region between the first terminal P1x and the point PU and a resistor R12 that corresponds to a region between the point PU and the second terminal P2x. The first resistive film RF1 and the second resistive film RF2 are in contact at the point PU, and the contact resistance thereof is represented by Rc. The resistance of a path from the point PU of the second resistive film RF2 to the third terminal P1y is represented by R2.

The electric potential at the point PU is a voltage obtained by dividing the voltage difference between the bias voltage Vb1 and the bias voltage Vb2 by the resistors R11 and R12. Accordingly, the electric potential at the point PU represents the X-coordinate of the point PU. The electric potential at the point PU is approximately the same as that at the third terminal P1y. That is to say, the panel voltage VPx that occurs at the third terminal P1y represents the X-coordinate of the point PU.

Known techniques can be employed as an algorithm used to derive the X-coordinate based upon the panel voltage VPx. The algorithm used in the present invention is not restricted in particular.

For the impedance on the control circuit 100 side seen at the third terminal P1y to be sufficiently high, the panel current IPx flows through a path formed of the first terminal P1x, the resistors R11 and R12, and the second terminal P2x. That is to say, the impedance Zs of a path between the first terminal P1x and the second terminal P2x is represented by Zs=R11+R12. The impedance Zs can be considered to be constant regardless of the position of the contact point PU. Furthermore, the impedance Zs is approximately the same as the impedance Zo when the user does not touch the panel. That is to say, the relation Zs≈Zo is satisfied.

Hereafter, the impedance in the non-contact state will not be distinguished from the impedance in the single-touch state in particular. These impedances will collectively be referred to as the "reference impedance Zo".

The panel current IPx that flows from the first terminal P1x to the second terminal P2x in either the single-touch state or in the non-contact state is represented by IPxo=(Vb1−Vb2)/Zo. The panel current IPxo will be referred to as the "reference panel current".

[Multi-Touch State]

Referring to FIG. 7B, when the user touches two points PU1 and PU2, the first resistive film RF1 is partitioned into a resistor R11 that corresponds to a region between the first terminal P1x and the point PU1, a resistor R12 that corresponds to a region between the point PU1 and the point PU2, and a resistor R13 that corresponds to a region between the point PU2 and the second terminal P2x. The first resistive film RF1 and the second resistive film RF2 are in contact at the points PU1 and PU2. The contact resistances at the points PU1 and PU2 are represented by Rc1 and Rc2.

With regard to the second resistive film RF2, the resistance that corresponds to a region between the points PU1 and PU2 is represented by R21, the resistance of a path from the point PU1 to the third terminal P1y is represented by R22, and the resistance of a path from the point PU2 to the third terminal P1y is represented by R23.

The panel current IPx in the multi-touch state is determined by the combined impedance Zm that corresponds to a path between the first terminal P1x and the second terminal P2x. The relation between the combined impedance Zm and the reference impedance Zo in either the non-contact state or the single-touch state is represented by Zm<Zo.

Thus, the relation between the panel current IPxm in the multi-touch state and the reference panel current IPxo is represented by IPxm>IPxo.

That is to say, by monitoring the panel current IPx, and by comparing the panel current IPx thus monitored with the reference panel current IPxo, such an arrangement is capable of distinguishing between the multi-touch state and the single-touch state (and the non-contact state).

The electric potentials at the points PU1 and PU2 are each voltages obtained by dividing the voltage difference between the bias voltages Vb1 and Vb2 with the resistors R11, R12, and R13 and other resistance components. Accordingly, the electric potentials at the points PU1 and PU2 each change according to their X-coordinates. Thus, the panel voltage VPx that occurs at the third terminal P1y also changes according to the positions of the points PU1 and PU2. Accordingly, when the multi-touch state is detected, the coordinates of the points PU1 and PU2 can be estimated based upon the panel voltage VPx.

More specifically, an X-coordinate X3 determined based upon the panel voltage VPx using the same algorithm as in the single-touch state represents a point positioned between the points PU1 and PU2 touched by the user. That is to say, with the X-coordinates of the points PU1 and PU2 actually touched by the user as X1 and X2, the relation X1<X3<X2 is satisfied.

That is to say, the coordinates of the points PU1 and PU2 can be estimated using the coordinate X3, the derivation of which is based upon the panel voltage VPx. Description will be made later regarding the estimation algorithm.

As described above, with the control circuit 100 according to the second embodiment, the panel current IPx is monitored in addition to the panel voltage VPx, and processing is performed on a combination of the panel voltage VPx and the panel current IPx thus monitored. Thus, such an arrangement is capable of determining the coordinates of user touch points not only in the single-touch state, but also in the multi-touch state.

Next, description will be made regarding a specific example configuration of the computation unit 40 and the processing operation thereof.

The computation unit 40 includes a multi-touch judgment unit 42, a distance calculation unit 44, a table 46, and a coordinate generating unit 48.

Figure 8:
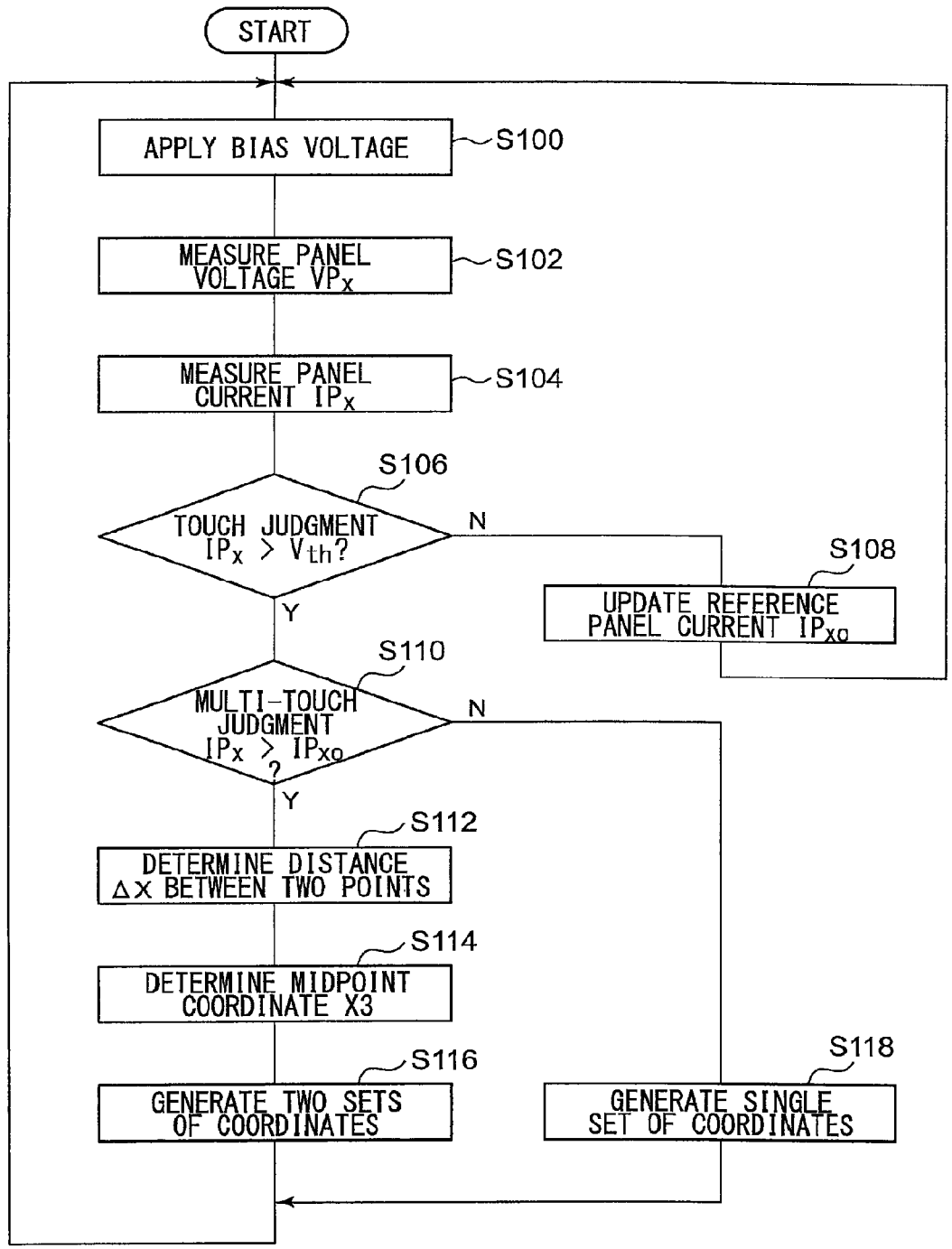
FIG. 8 is a flow chart which shows the processing performed by the control circuit shown in FIG. 6.

FIG. 8 is a flow chart which shows processing performed by the control circuit 100 shown in FIG. 6. The flow shown in FIG. 8 shows the processing used to determine the X-coordinate in the first state ϕx. It should be noted that, to such an extent that the processing is not adversely affected, the sequence of the steps can be rearranged, or several steps can be simultaneously executed in a parallel manner.

First, the voltage generating unit 10 applies the bias voltages Vb1 and Vb2 to the first terminal P1x and the second terminal P2x, respectively (S100). In this state, the voltage detection unit 20 measures the panel voltage VPx (S102), and the current detection unit 30 measures the panel current IPx (S104).

The computation unit 40 receives the digital values VPx' and IPx' that correspond to the panel voltage VPx and the panel current IPx thus obtained.

Subsequently, judgment is made whether or not the user touched the panel (S106). When the user touches a point having a low X-coordinate (in the vicinity of the edge E1), the panel voltage VPx is high, and when the user touches a point having a high X-coordinate (in the vicinity of the edge E2), the panel voltage VPx is low. In the non-contact state, no voltage is applied to the third terminal P1y. Accordingly, in this state, the panel voltage VPx is approximately zero.

Thus, the coordinate generating unit 48 judges whether or not the user touched the panel, by comparing the panel voltage VPx with a predetermined threshold voltage Vth. The threshold voltage Vth is set to a value in the vicinity of 0 V.

When VPx>Vth ("YES" in S106), judgment is made that the user touched the panel. Subsequently, the multi-touch judgment unit 42 judges whether or not a multi-touch operation was performed (S110). Judgment of whether or not a multi-touch operation was performed is made by comparing the panel current IPx with a predetermined reference current IPxo, as described above.

When IPx<IPxo ("NO" in S110), the multi-touch judgment unit 42 judges that a single-touch operation was performed, and notifies the coordinate generating unit 48 of this judgment result. The coordinate generating unit 48 determines the X-coordinate based upon the panel voltage VPx (S118).

When IPx>IPxo ("YES" in S110), the multi-touch judgment unit 42 judges that a multi-touch operation was performed, and notifies the distance calculation unit 44 and the coordinate generating unit 48 of this judgment result.

If judgment is made that a multi-touch operation was performed, the distance calculation unit 44 determines the distance ΔX between the two points PU1 and PU2 (S112).

The present inventor has come to recognize that there is a correlation between the distance ΔX between the two points PU1 and PU2 and the panel current IPx. That is to say, when the distance ΔX between the two points is zero, the state is equivalent to that of a single-touch operation, and therefore the panel current IPx is approximately the same as the reference current IPxo.

Figure 9A:
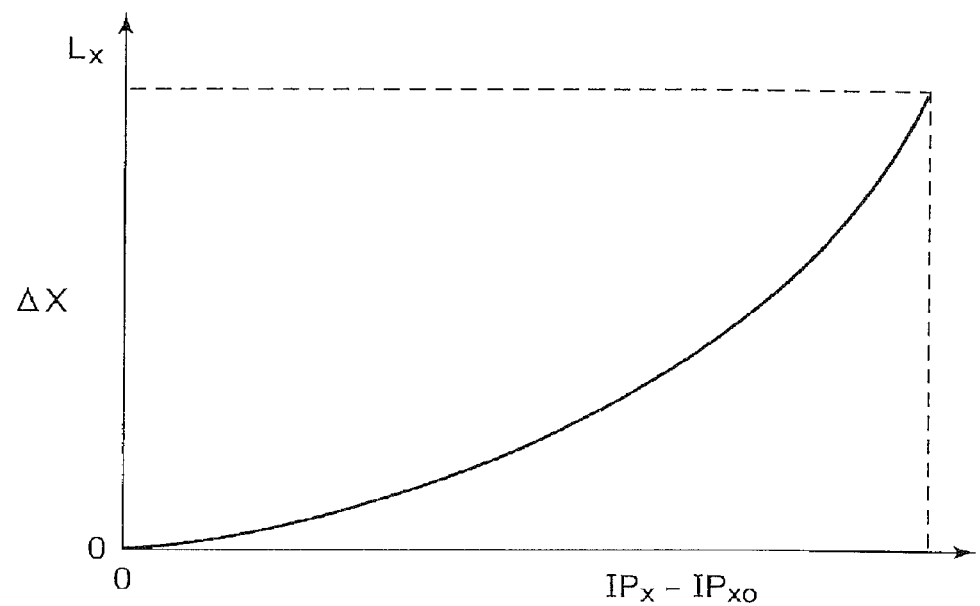
FIGS. 9A and 9B are a graph and a diagram showing the relation between the panel current and the points in the multi-touch state, respectively.
Figure 9B:
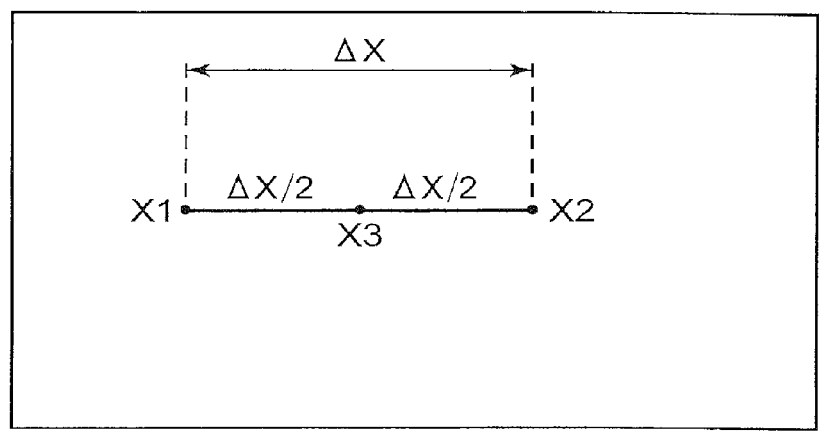

FIGS. 9A and 9B are a graph and a diagram each showing the relation between the panel current and the points in the multi-touch state.

As the distance ΔX between the two points increases, the length of the region which is equivalent to the resistors R12 and R21 connected in parallel increases. Accordingly, the combined impedance Zm of a path between the first terminal P1x and the second terminal P2x drops. Thus, the panel current IPx increases according to the drop in the combined impedance Zm. When the distance ΔX between the two points reaches the length Lx of the panel in the X direction, the panel current exhibits the minimum value IPxmin.

That is to say, there is a one-to-one correspondence between the panel current IPx and the distance ΔX between the two points. In other words, there is a one-to-one correspondence between the panel current IPx and the current difference (IPx−IPxo) between the panel current IPx and the reference current IPxo. FIG. 9A is a graph which shows the relation between the current difference (IPx−IPxo) and the distance ΔX.

The characteristics shown in FIG. 9A should be measured for each touch panel 4. Alternatively, the characteristics shown in FIG. 9A may be calculated by simulation. The table 46 stores the relation between the current difference (IPx−IPxo) and the distance ΔX.

The distance calculation unit 44 determines the distance ΔX to be measured, based upon the panel current IPx with reference to the table 46, and outputs the distance ΔX thus determined to the coordinate generating unit 48. It should be noted that an arrangement may be made in which an approximate analytical equation which represents the characteristics shown in FIG. 9A is stored, and the distance ΔX is obtained by calculation, instead of an arrangement employing the table 46.

The coordinate generating unit 48 receives the data which represent the distance ΔX and the panel voltage VPx. The coordinate generating unit 48 calculates the X-coordinate X3 that corresponds to the panel voltage VPx using the same algorithm as that used in the single-touch state, or an algorithm that is different from that used in the single-touch state. The X-coordinate X3 thus calculated is taken as the midpoint coordinate between the two points (S114).

The coordinate generating unit 48 determines the coordinate PU2 of one of the two points by adding a value ΔX/2, which corresponds to the interval between the two coordinates ΔX (in this example, half the distance ΔX), to the midpoint coordinate X3, and determines the other coordinate PU1 of the two points by subtracting, from the midpoint coordinate X3, the value ΔX/2 which corresponds to the distance ΔX between the two coordinates (S116). FIG. 9B shows this processing. Subsequently, the flow returns to Step S100.

Referring to Step S106 again, when VPx<Vth ("NO" in S106), the coordinate generating unit 48 judges that the panel is in the non-contact state. Subsequently, in Step S104, the multi-touch judgment unit 42 updates the reference panel current IPxo using the panel current IPx thus measured (S108). Subsequently, the flow returns to Step S100.

The above is a specific flow of the processing performed by the control circuit 100.

With the input apparatus 2, the single-touch state and the multi-touch state can be appropriately distinguished. Thus, the input apparatus 2 is capable of generating point coordinates in both states. Furthermore, the input apparatus 2 according to the second embodiment has the following advantages.

In Step S108, the reference panel current IPxo is updated. Thus, such an arrangement reduces the effects of time-related deterioration or fluctuations in temperature on the touch panel 4. That is to say, if the resistance values of the first resistive film RF1, the second resistive film RF2, and the contact resistance therebetween change due to deterioration or fluctuations in temperature, the reference current IPxo also changes according to the change in the resistance values. Accordingly, if a fixed value is used as the value of the reference current IPxo, such an arrangement leads to false detection of the multi-touch state. Alternatively, this leads to error in the distance ΔX between the two points. In contrast, by updating the reference current IPxo in the processing, such an arrangement is capable of appropriately solving such a problem.

Furthermore, such an arrangement in which the distance ΔX between the two points is determined using the current difference (IPx−IPxo) in the multi-touch state has the following advantage. As described above, the impedance of the panel changes due to time-related deterioration or fluctuations in temperature. In this case, even if the user touches the panel at the same coordinates, the panel current IPx changes. In order to solve such a problem, by calculating the current difference, such an arrangement reduces the effects of time-related deterioration and fluctuations in temperature. Thus, such an arrangement provides precise coordinate detection.

Figure 10:
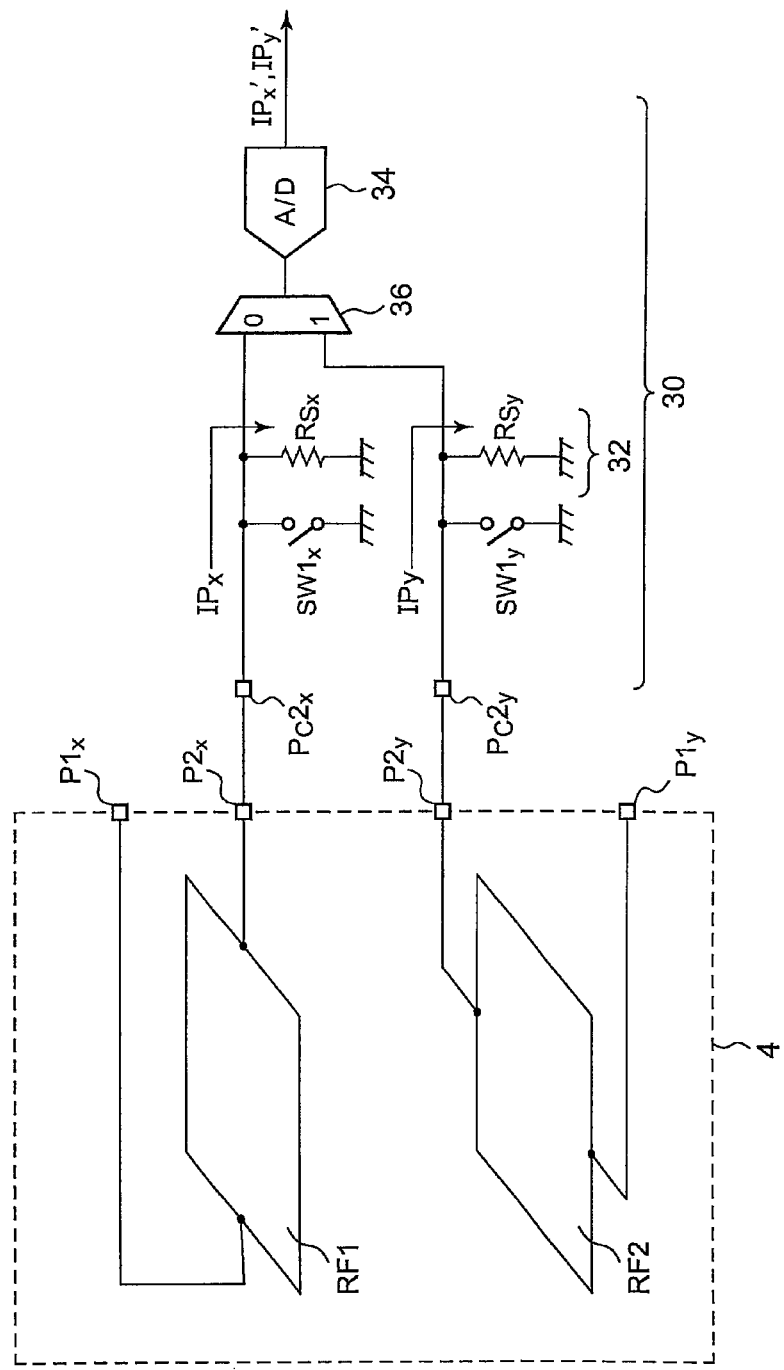
FIG. 10 is a circuit diagram which shows an example configuration of a current detection unit shown in FIG. 6.

FIG. 10 is a circuit diagram which shows an example configuration of the current detection unit 30 shown in FIG. 6. The current detection unit 30 includes detection resistors Rsx and Rsy, bypass switches SW1x and SW1y, a selector 36, and an A/D converter 34. The detection resistors Rsx and Rsy correspond to the I/V conversion unit 32 shown in FIG. 6.

The detection resistor Rsx and the bypass switch SW1x are used to detect the coordinate in the X-axis direction, and the detection resistor Rsy and the bypass switch SW1y are used to detect the coordinate in the Y-axis direction. The circuit blocks used to detect the X-axis coordinate and the Y-axis coordinate have the same configuration. Accordingly, description will be made below only regarding an arrangement used to detect the coordinate in the X-axis direction.

The detection resistor Rsx is provided as an extension to a path that includes the first terminal P1x, the first resistive film RF1, and the second terminal P2x. Specifically, one terminal of the detection resistor Rsx is grounded, and is set to a fixed electric potential. The other terminal thereof is connected to the second terminal Pc2x.

The bypass switch SW1x is arranged in parallel with the corresponding detection resistor Rsx. Specifically, one terminal of the bypass switch SW1x is grounded, and the other terminal thereof is connected to the second terminal Pc2x.

When the voltage detection unit 20 detects the panel voltage VPx, the bypass switch SWx is turned on. In this state, the detection resistor Rs does not affect the combined impedance of the touch panel 4. Thus, such an arrangement is capable of measuring the panel voltage VPx with high precision.

When the current detection unit 30 detects the panel current IPx, the bypass switch SWx is turned off. In this state, a voltage drop which is proportional to the panel current IPx (Rx×IPx) occurs at the detection resistor Rsx. When the coordinate in the X-axis direction is to be detected, the terminal (0) side of the selector 36 is on, and when the coordinate in the Y-axis direction is to be detected, the terminal (1) side of the selector 36 is on. The A/D converter 34 converts the voltage drop that occurs at the detection resistor Rsx into a digital value. The digital value thus converted represents a value that corresponds to the panel current TPx.

It should be noted that, when the ground voltage is used as the second bias voltage Vb2, such an arrangement allows the bypass switch SW1x to function as the voltage generating unit 10. That is to say, when the second bias voltage Vb2 is to be applied to the second terminal P2x, the bypass switch SW1x should be turned on. The same can be said of the bypass switch SW1y.

Figure 11:
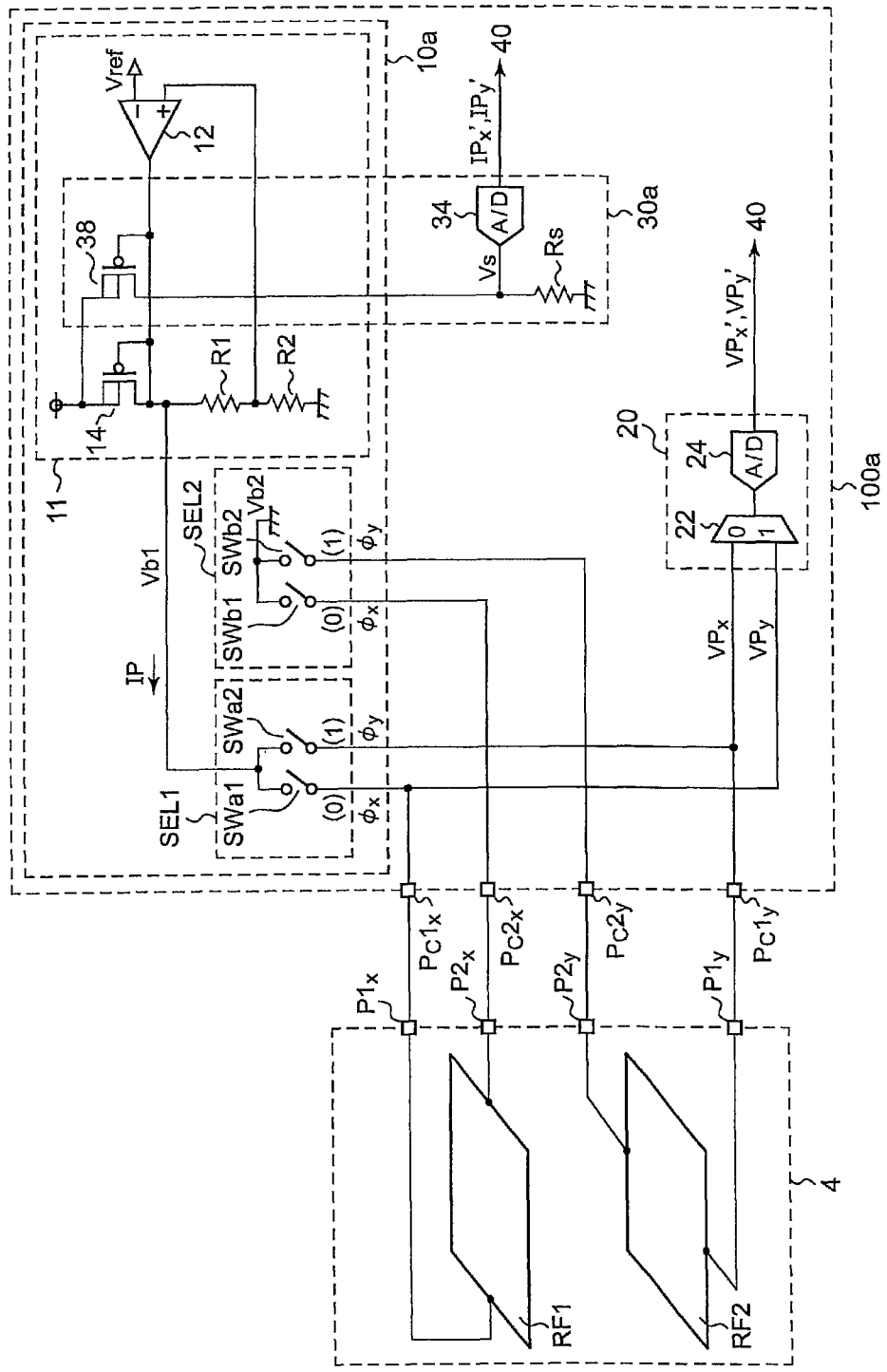
FIG. 11 is a circuit diagram which shows another example configuration of a control circuit shown in FIG. 6.

FIG. 11 is a circuit diagram which shows another example configuration of a portion of the control circuit shown in FIG. 6.

A voltage generating unit 10a included in a control circuit 100a includes a regulator 11, a first selector SEL1, and a second selector SEL2.

The regulator 11 and the first selector SEL1 generate the first bias voltage Vb1. In the first state ϕx, the first bias voltage Vb1 is applied to the first terminal P1x. In the second state ϕy, the first bias voltage Vb1 is applied to the third terminal P1y.

The regulator 11 generates the first bias voltage Vb1 that corresponds to the reference voltage Vref. The regulator 11 is configured as a typical linear regulator including an operational amplifier 12, an output transistor 14, a first resistor R1, and a second resistor R2. Accordingly, description regarding the configuration and the operation thereof will be omitted. The first bias voltage Vb1 is represented by the Expression Vb1=Vref×(R1+R2)/R2. The value of the reference voltage Vref may be switched based upon whether the state is the first state ϕx or the second state ϕy.

The first selector SEL1 receives the first bias voltage Vb1 via the input terminal thereof. The first output terminal (0) of the first selector SEL1 is connected to the first terminal Pc1x. The second output terminal (1) of the first selector SEL1 is connected to the third terminal Pc1y. In the first state ϕx, the first output terminal (0) side of the first selector SEL1 is on, and in the second state ϕy, the second output terminal (1) side of the first selector SEL1 is on. For example, the first selector SEL1 includes switches SWa1 and SWa2 each configured to switch on and off in a complementary manner.

The second selector SEL2 is provided in order to allow the second bias voltage Vb2 to be applied to the touch panel 4.

The second bias voltage Vb2 is the ground voltage. The second selector SEL2 includes switches SWb1 and SWB2 configured to switch on and off in a complementary manner. In the first state φx, the switch SWb1 is on. In the second state φy, the switch SWb2 is on.

The current detection unit 30a includes a detection transistor 38, a detection resistor Rs, and an A/D converter 34. The detection transistor 38 is connected to the output transistor 14 of the regulator 11 in a current-mirror manner. The detection current Is, which is proportional to the current that flows through the output transistor 14, i.e., the panel current, flows through the detection transistor 38. With the mirror ratio of the current mirror circuit written as K1, the relation Is=K1×IP is satisfied.

The detection resistor Rs is arranged on a path of the detection transistor Rs. A voltage drop Vs which is proportional to the detection current Is occurs at the detection transistor Rs. The voltage drop Vs is proportional to the panel current IP. That is to say, the following relation is satisfied.

$$Vs = Rs \times Is = Rs \times K1 \times IP$$

The A/D converter 34 converts the voltage drop Vs that occurs at the detection resistor Rs into a digital value, and outputs the digital values thus converted as the signals IPx' and IPy', which represent the panel current IP.

Compared with the control circuit employing the current detection unit 30 shown in FIG. 10, the control circuit 100a shown in FIG. 11 has the following advantages.

With the control circuit 100a shown in FIG. 11, the detection resistor Rs for converting the panel current IP into a voltage is not directly connected to the touch panel 4. Thus, such an arrangement is capable of detecting the panel current IP without having an effect on the panel voltage VP.

In contrast, in a case in which the current detection unit 30 shown in FIG. 10 is employed, there is a need to switch the state between a state in which the bypass switch SW1x (or SW1y) is on for measurement of the panel voltage VPx (or VPy), and a state in which the bypass switch SW1x (or SW1y) is off for measurement of the panel current IPx (or IPy). Accordingly, in some cases, in such an arrangement, some time is required to perform coordinate detection. Furthermore, with such an arrangement, the panel voltage VPx and the corresponding panel current IPx (or a combination of VPy and IPy) are measured at different timings. This leads to poor precision in the coordinate measurement.

In contrast, the control circuit 100a shown in FIG. 11 is capable of simultaneously measuring the panel voltage and the panel current in a parallel manner, thereby providing high-speed processing. Thus, such an arrangement is suitably employed in applications which require a high-speed operation. Furthermore, such an arrangement is capable of acquiring two parameters required to determine the coordinates, i.e., the voltage and the current, at the same time. Thus, such an arrangement is capable of determining the coordinates with high precision.

In some cases, the difference ΔI in the panel current between when a single point is touched and when two points are touched is extremely small, depending on the individual panel. In this case, with the control circuit 100 shown in FIG. 10, assuming that the current difference ΔI=200 μA, and the detection resistor Rs has a resistance of 200Ω, the change ΔV in the voltage drop that occurs at the detection resistor Rs is only 40 mV (ΔV=40 mV). This means that such an arrangement requires the A/D converter 34 to operate at high resolution. This leads to a difficulty in designing the control circuit 100. Alternatively, this leads to increased costs.

In contrast, with the control circuit 100a shown in FIG. 11, by optimizing the mirror ratio K1, such an arrangement ensures a sufficient amount of change ΔV of the voltage drop Vs that occurs at the detection resistor Rs. Thus, such an arrangement enables a reduction in the required precision of the A/D converter 34.

The current detection unit 30a may adjust the mirror ratio K1 between the output transistor 14 and the detection transistor 38 according to whether the state is in the first state φx or the second state φy. Also, the detection resistor Rs may be configured as a variable resistor. With such an arrangement, the current detection unit 30a may adjust the resistance value of the detection resistor Rs according to whether the state is in the first state φx or the second state φy, instead of or in addition to the operation for adjusting the mirror ratio described above.

In a case in which there is a large difference between the vertical length and the horizontal length (i.e., the aspect ratio) of the touch panel 4, it is assumed that there is a difference in the combined resistance between the vertical direction and the horizontal direction. Accordingly, in some cases, there is a difference in the panel current range between the panel current IPx in the X direction and the panel current IPy in the Y direction. In this case, by adjusting the mirror ratio K1 or the resistance value of the detection resistor Rs according to whether the state is in the first state φx or the second state φy, such an arrangement is capable of providing matching voltage ranges for the voltage drop Vs that occurs at the detection resistor Rs. Thus, such an arrangement allows the A/D converter 34, which is provided as a single A/D converter shared by the operations in both states, to perform processing with high precision.

The output transistor 14 and the detection transistor 38 shown in FIG. 11 form a current mirror circuit. Also, this current mirror circuit may be configured as a cascode mirror circuit. Such an arrangement improves the current reproduction precision, i.e., improves the precision of the mirror ratio.

Figure 12:
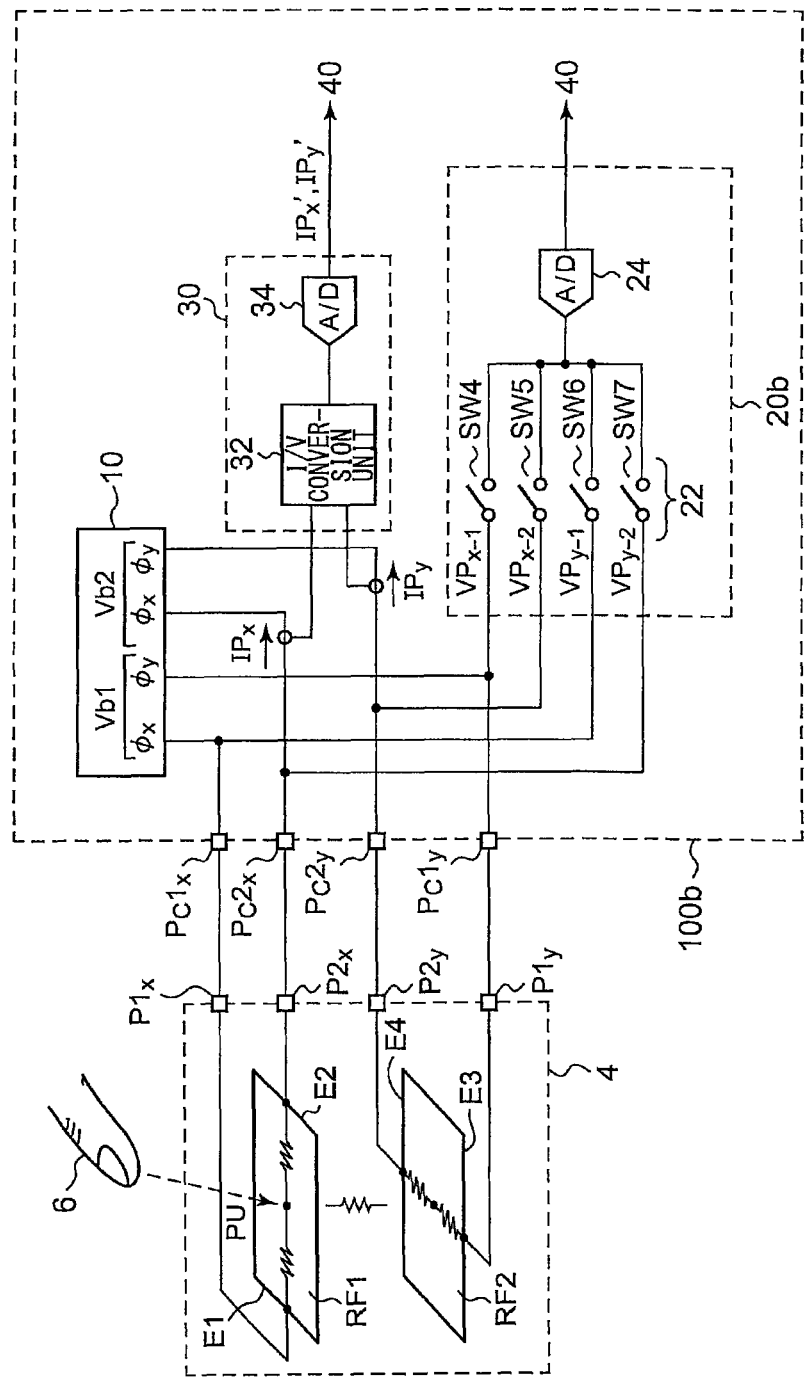
FIG. 12 is a circuit diagram which shows yet another example configuration of the control circuit shown in FIG. 6.

FIG. 12 is a circuit diagram which shows a modification of the control circuit shown in FIG. 6. There is a difference in the processing of the panel voltage VP between a control circuit 100b shown in FIG. 12 and the control circuit 100 shown in FIG. 6. That is to say, in the first state φx, the voltage detection unit 20 shown in FIG. 6 detects the panel voltage VPx that occurs at the third terminal P1y. In the second state φy, the voltage detection unit 20 detects the panel voltage VPy that occurs at the first terminal P1x. In contrast, in the first state φx, a voltage detection unit 20b shown in FIG. 12 independently detects the panel voltages VPx_1 and VPx2 that respectively occur at the third terminal P1y and the fourth terminal P2y. In the second state φ2, the voltage detection unit 20b independently detects the panel voltages VPy_1 and VPy_2 that respectively occur at the first terminal P1x and the second terminal P2x.

The voltage detection unit 20b includes switches SW4 through SW7, and an A/D converter 24. The switches SW4 through SW7 correspond to the selector 22 shown in FIG. 22.

In the first state φx, first, the switch SW4 is turned on, and the other switches are turned off. In this state, the panel voltage VPx_1 at the third terminal P1y is measured. Subsequently, the switch SW5 is turned on, and the other switches are turned off. In this state, the panel voltage VPx_2 at the fourth terminal P2y is measured. The computation unit 40 (not shown) provided as a downstream component determines the X-coordinate of the point PU touched by the user, based upon the two panel voltages VPx_1 and VPx_2 and the panel current IPx.

Similarly, in the second state ϕy, first, the switch SW6 is turned on, and the other switches are turned off. In this state, the panel voltage VPy_1 at the first terminal P1x is measured. Subsequently, the switch SW7 is turned on, and the other switches are turned off. In this state, the panel voltage VPy_2 at the second terminal P2x is measured. The computation unit 40 (not shown) provided as a downstream component determines the Y-coordinate of the point PU touched by the user, based upon the two panel voltages VPy_1 and VPy_2 and the panel current IPy.

With such a modification, in each of the first state ϕx and the second state ϕy, panel voltages at the two terminals are measured. Thus, the X-coordinate and the Y-coordinate of the point can each be determined based upon the panel voltages at the corresponding two terminals thus measured, thereby improving the precision of the coordinate detection.

Also, the features of the modification shown in FIG. 12 may be incorporated in the control circuit shown in FIG. 11.

Description has been made regarding the present invention with reference to the first and second embodiments. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made regarding an arrangement in which, in the multi-touch state, the coordinate generating unit 48 determines the target coordinates X1 and X2 assuming that the coordinate X3 that corresponds to the panel voltage VPx is the midpoint between the two points PU1 and PU2. However, the present invention is not restricted to such an arrangement. Also, a more complicated algorithm may be employed.

Description has been made in the embodiments regarding an arrangement in which a portion of the control circuit 100 is shared by the operations in the first state ϕx and the second state ϕy. Also, fully dedicated control circuits may be provided for the processing in the first state ϕx and the processing in the second state ϕy. Also, the present invention may be applied to either the X direction only or the Y direction only.

Description has been made in the embodiment regarding an arrangement configured to control the four-terminal touch panel 4. However, the present invention is not restricted to such an arrangement. Also, the present invention may be applied to other types of touch panels 4.

As an example, description has been made in the embodiments regarding an arrangement in which two points are detected in the multi-touch state. Also, an arrangement can be conceived by those skilled in this art in which three or more points are detected in the multi-touch state, which is encompassed by the present invention.

While the preferred embodiments of the present invention have been described using specific terms, such description is for illustrative purposes only, and it is to be understood that changes and variations may be made without departing from the spirit or scope of the appended claims.

What is claimed is:

1. A control method, for a touch panel comprising a first terminal, a second terminal, a third terminal, a first resistive film arranged such that one edge thereof is connected to the first terminal and an edge that is opposite to the aforementioned one edge is connected to the second terminal, and a second resistive film arranged with a gap between it and the first resistive film such that one edge thereof is connected to the third terminal, the control method comprising:

applying a predetermined first bias voltage and a predetermined second bias voltage to the first and second terminals, respectively;
detecting a panel voltage that occurs at the third terminal;
detecting a panel current that flows through a path including the first terminal, the first resistive film, and the second terminal; and
determining coordinates touched by a user, based upon the panel voltage and the panel current, wherein, when the user touches two points, the panel current has a value according to an interval between the two points, and there is a one-to-one correspondence between the panel current and the interval between the two points,
and wherein the control method further comprises
determining the interval between the two points based upon the value of the panel current by referring to the one-to-one correspondence when the user touches two points,
wherein the judgment processing comprises:
determining the midpoint between the two coordinates based upon the panel voltage; and
determining the coordinates of one of the two points by adding a value that corresponds to the interval between the two coordinates to the midpoint coordinates, and determining the coordinates of the other of the two points by subtracting, from the midpoint coordinates, a value that corresponds to the interval between the two coordinates.

2. A method according to claim 1, wherein, when the value of the panel current is greater than a predetermined value, judgment is made that the user touched multiple points.

3. A method according to claim 1, wherein the interval between the two coordinates is determined to be a value which increases according to an increase in the panel current.

4. A method according to claim 1, wherein the interval between the two coordinates is determined based upon the difference between the panel current measured when the user does not touch the panel and the panel current measured when the user touches the panel.

5. A control circuit configured to control a touch panel comprising a first terminal, a second terminal, a third terminal, a first resistive film arranged such that one edge thereof is connected to the first terminal and an edge that is opposite to the aforementioned one edge is connected to the second terminal, and a second resistive film arranged with a gap between it and the first resistive film such that one edge thereof is connected to the third terminal, the control circuit comprising:

a voltage generating unit configured to apply a predetermined first bias voltage and a predetermined second bias voltage to the first and second terminals, respectively;
a voltage detection unit configured to detect a panel voltage that occurs at the third terminal;
a current detection unit configured to detect a panel current that flows through a path including the first terminal, the first resistive film, and the second terminal; and
a coordinate determination unit configured to determine the coordinates touched by the user, based upon the panel voltage and the panel current thus detected,
when the user touches two points, the panel current has a value according to an interval between the two points, and there is a one-to-one correspondence between the panel current and the interval between the two points,
and the interval between the two points is determined based upon the value of the panel current by referring to the one-to-one correspondence, wherein the coordinate determination unit determines the midpoint between the aforementioned two coordinates, based upon the panel voltage, and wherein the coordinates of one of the aforementioned two points are determined by adding a value that corresponds to the interval between the two coordinates to the midpoint coordinates, and wherein the coordinates of the other of the two points are determined by subtracting, from the midpoint coordinates, a value that corresponds to the interval between the two coordinates.

6. A control circuit according to claim 5, wherein, when the value of the panel current is greater than a predetermined value, the coordinate determination unit judges that the user touched multiple points.

7. A control circuit according to claim 5, wherein the interval between the two coordinates is determined based upon the difference between the panel current measured when the user does not touch the panel and the panel current measured when the user touches the panel.

8. A control circuit configured to control a touch panel comprising a first terminal, a second terminal, a third terminal, a first resistive film arranged such that one edge thereof is connected to the first terminal and an edge that is opposite to the aforementioned one edge is connected to the second terminal and a second resistive film arranged with a gap between it and the first resistive film such that one edge thereof is connected to the third terminal, the control circuit comprising:

a voltage generating unit configured to apply a predetermined first bias voltage and a predetermined second bias voltage to the first and second terminals, respectively;

a voltage detection unit configured to detect a panel voltage that occurs at the third terminal;

a current detection unit configured to detect a panel current that flows through a path including the first terminal, the first resistive film, and the second terminal; and a coordinate determination unit configured to determine the coordinates touched by the user, based upon the panel voltage and the panel current thus detected, when the user touches two points, the panel current has a value according to an interval between the two points, and there is a one-to-one correspondence between the panel current and the interval between the two points, and the interval between the two points is determined based upon the value of the panel current by referring to the one-to-one correspondence, wherein the current detection unit comprises:

a detection resistor arranged as an extension to a path that includes the first terminal, the first resistive film, and the second terminal; and a bypass switch arranged in parallel with the detection resistor, wherein, when the panel voltage is to be detected by means of the voltage detection unit, the bypass switch is turned on, and wherein, when the panel current is to be detected by means of the current detection unit, the bypass switch is turned off, and wherein a value that corresponds to a voltage drop that occurs at the detection resistor is output as a value which represents the panel current.

9. The control circuit according to claim 8, wherein, when the value of the panel current is greater than a predetermined value, the coordinate determination unit judges that the user touched multiple points.

10. The control circuit according to claim 8, wherein the interval between the two coordinates is determined based upon the difference between the panel current measured when the user does not touch the panel and the panel current measured when the user touches the panel.

11. A touch panel input apparatus comprising:

a touch panel comprising a first terminal, a second terminal, a third terminal, a first resistive film arranged such that one edge thereof is connected to the first terminal and an edge that is opposite to the aforementioned one edge is connected to the second terminal, and a second resistive film arranged with a gap between it and the first resistive film such that one edge thereof is connected to the third terminal; and a control circuit configured to control the touch panel, wherein the control circuit comprises:

a voltage generating unit configured to apply a predetermined first bias voltage and a predetermined second bias voltage to the first and second terminals, respectively;

a voltage detection unit configured to detect a panel voltage that occurs at the third terminal;

a current detection unit configured to detect a panel current that flows through a path including the first terminal, the first resistive film, and the second terminal; and a coordinate determination unit configured to determine the coordinates touched by the user, based upon the panel voltage and the panel current thus detected, when the user touches two points, the panel current has a value according to an interval between the two points, and there is a one-to-one correspondence between the panel current and the interval between the two points, and the interval between the two points is determined based upon the value of the panel current by referring to the one-to-one correspondence, wherein the coordinate determination unit determines the midpoint between the aforementioned two coordinates, based upon the panel voltage, and wherein the coordinates of one of the aforementioned two points are determined by adding a value that corresponds to the interval between the two coordinates to the midpoint coordinates, and wherein the coordinates of the other of the two points are determined by subtracting, from the midpoint coordinates, a value that corresponds to the interval between the two coordinates.

12. An electronic device comprising a touch panel input apparatus according to claim 11.

* * * * *